United States Patent [19]

Nagata et al.

[11] Patent Number: 5,027,226
[45] Date of Patent: Jun. 25, 1991

[54] CONTACT TYPE IMAGE SENSOR

[75] Inventors: Takehito Nagata; Mitsuhiro Kohata; Masumitsu Ino, all of Yokohama, Japan

[73] Assignees: Ricoh Company, Ltd., Tokyo; Rocoh Research Institute of General Electronics, Natori, both of Japan

[21] Appl. No.: 245,204

[22] Filed: Sep. 16, 1988

[30] Foreign Application Priority Data

Sep. 18, 1987 [JP] Japan .................. 62-234043
Sep. 18, 1987 [JP] Japan .................. 62-234044
Sep. 18, 1987 [JP] Japan .................. 62-234045
May 19, 1988 [JP] Japan .................. 63-122880

[51] Int. Cl.$^5$ .................................... H04M 1/04
[52] U.S. Cl. .................... 358/482; 358/213.11
[58] Field of Search ............ 358/294, 213.121, 482, 358/483; 250/518, 578.1

[56] References Cited

U.S. PATENT DOCUMENTS

| 4,352,128 | 9/1982 | Ohori et al. | 358/294 |
| 4,424,590 | 1/1984 | Ozawa | 358/482 |
| 4,566,040 | 1/1986 | Ozawa et al. | 358/482 |
| 4,763,010 | 8/1988 | Fukaya et al. | 250/578 |
| 4,819,082 | 4/1989 | Ito et al. | 358/482 |

FOREIGN PATENT DOCUMENTS

| 57-66663 | 4/1982 | Japan | 358/482 |
| 57-66665 | 4/1982 | Japan | 358/4823 |
| 58-97860 | 6/1983 | Japan | 358/482 |
| 39572 | 2/1986 | Japan . | |

OTHER PUBLICATIONS

Okumura et al., "Amorphous Si:H Liner Image Sensor Operated by a-Si:H TFT Array", Extended Abstracts of the 15th Conference on Solid State Devices and Materials, Tokyo, 1983, pp. 201-204.

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

A contact type image sensor has a driving circuit part which sequentially drives a plurality of photoelectric conversion elements of a photodetector in blocks which respectively have an arbitrary number of photoelectric conversion elements. The driving circuit part has a pair of shift registers, one for sequentially selecting the block and the other for sequentially selecting each of the photoelectric conversion elements within the selected block.

4 Claims, 22 Drawing Sheets

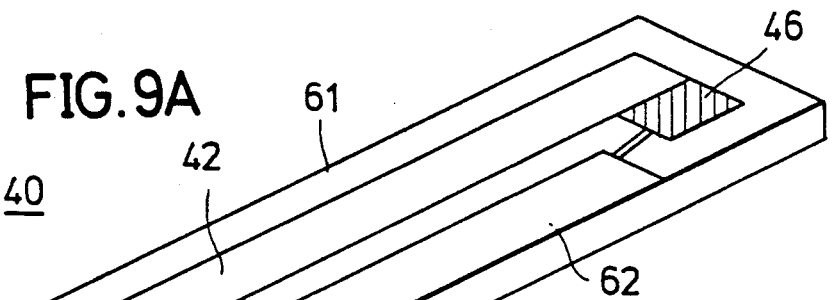
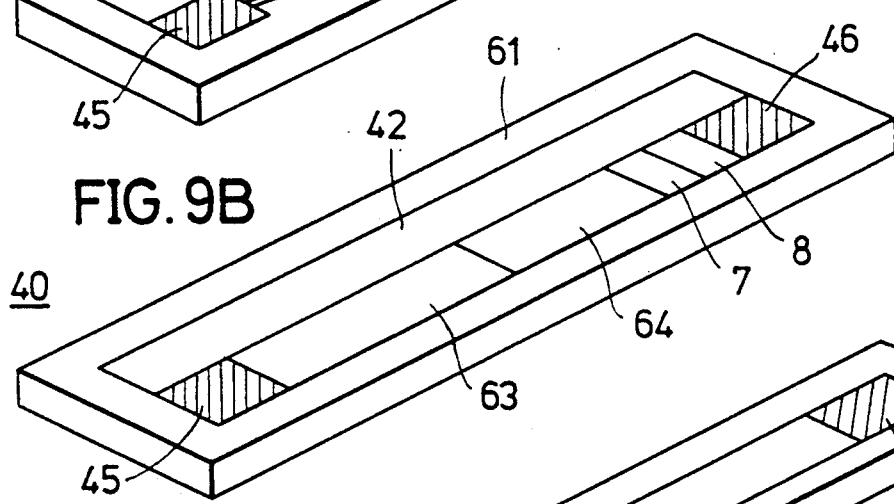
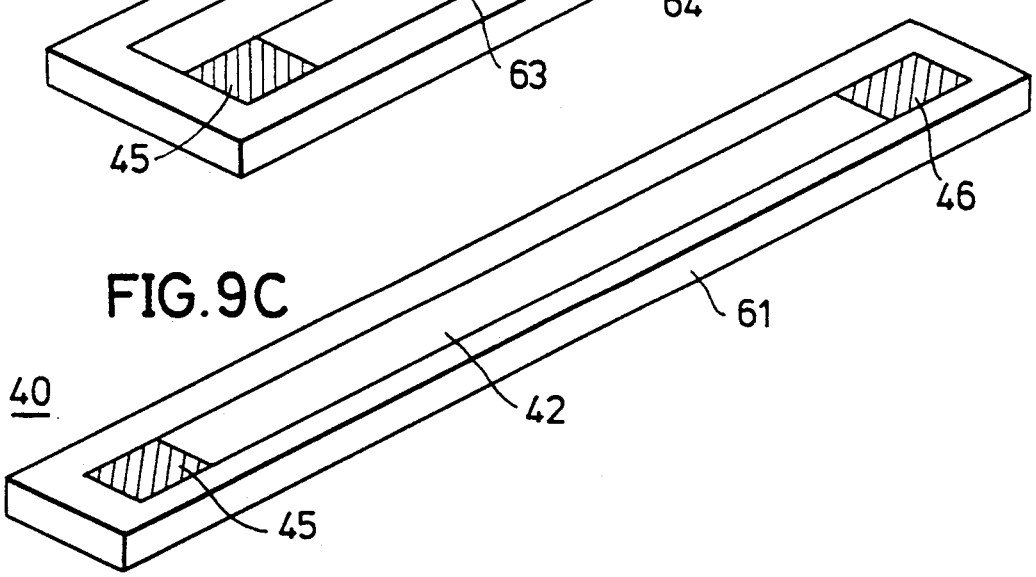
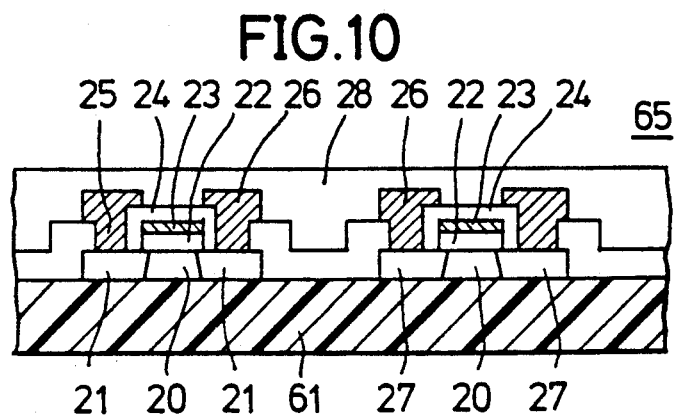

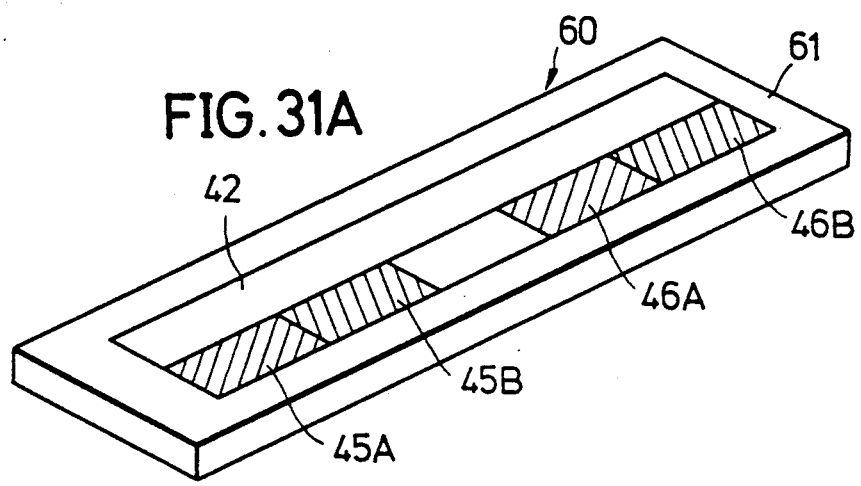
FIG.31A
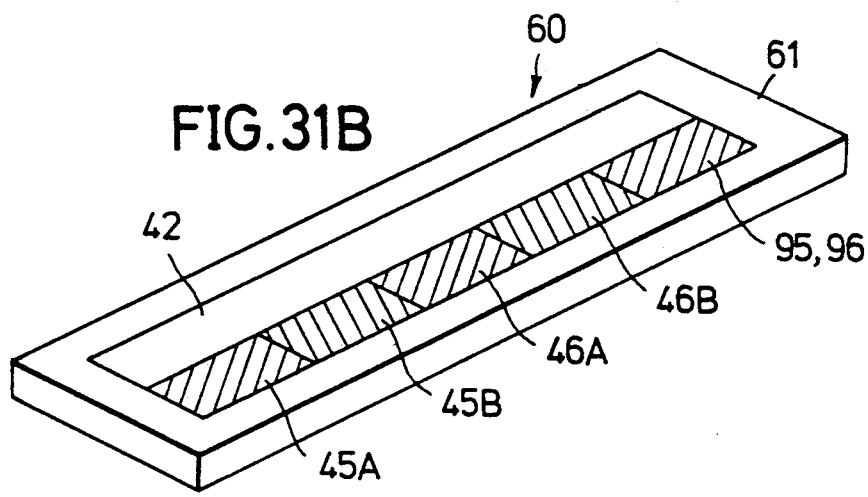
FIG.31B
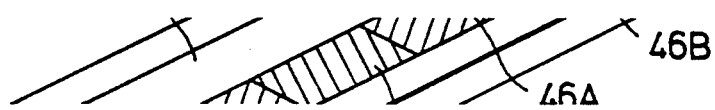

CONTACT TYPE IMAGE SENSOR

BACKGROUND OF THE INVENTION

The present invention generally relates to contact type image sensors, and more particularly to a contact type image sensor for use in a document scanner and the like.

In a document scanner, the overall size of the document scanner inevitably becomes large when an image sensor requires an optical reduction system. Hence, there are document scanners which use a contact type image sensor having a size in correspondence with a maximum document size which is to be read. In other words, the contact type image sensor extends for a length corresponding to a maximum width or length of the document which is to be read, and there is no need to use an optical reduction system.

FIG. 1 shows a circuit construction of an example of a conventional contact type image sensor. A contact type image sensor 10 has a photodetector 2 made up of a plurality of photoelectric conversion elements 1, an analog switch part 3 made up of a plurality of switches, a buffer part 4 made up of a plurality of buffers, a driving circuit 5 and a signal processing circuit 9. First terminals of the photoelectric conversion elements 1 are connected to the corresponding switches of the analog switch part 3.

Each photoelectric conversion element 1 is shown as having a photodiode structure with a photodiode PD and a sensor capacitance CD connected in parallel. A switch of the switch part 3 and a buffer of the buffer part 4 are provided in correspondence with each photoelectric conversion element 1. The driving circuit 5 is constituted by a shift register and sequentially operates the switches of the analog switch part 3 responsive to clock signals $\phi_{CLK}$ and $\overline{\phi}_{CLK}$ and a start pulse signal $\overline{SP}$ so as to selectively drive the photoelectric conversion elements 1. Each bit of the photodetector 2, that is, each photoelectric conversion element 1 corresponds to one bit of the shift register (5). Similarly, each switch of the analog switch part 3 corresponds to one bit of the shift register (5). MP denotes a power source voltage for the photodetector 2.

The signal processing circuit 9 is connected in common to second terminals of the photoelectric conversion elements 1. The signal processing circuit 9 has a current-to-voltage (C/V) converting circuit 6, a peak holding circuit 7 and an analog-to-digital (A/D) converter 8. For example, the C/V converting circuit 6 has operational amplifiers coupled in two stages. An output signal of the C/V converting circuit 6 is passed through the peak holding circuit 7 and the A/D converter 8, and an output digital data is obtained from the A/D converter 8. For example, the A/D converter 8 has an integrating circuit.

When reading a document image, all of the bits of the photodetector 2 are set to a high level and all of the sensor capacitances CD are charged. A light is irradiated on each bit of the photodetector 2 depending on black and white portions of the document image, and the sensor capacitances CD of those photoelectric conversion elements 1 which receive the light discharge. The driving circuit 5 sequentially turns ON the switches of the analog switch part 3 and a resulting current which flows through the photodiode PD is converted into a voltage in the C/V converting circuit 6. The peak holding circuit 7 reads a voltage dependent on the intensity of the light by holding the peak value of the output voltage of the C/V converting circuit 6. The A/D converter 8 converts the read voltage from the peak holding circuit 7 into a digital data describing gradation levels of the document image.

When the start pulse signal $\overline{SP}$ is applied to the driving circuit (shift register) 5, an output signal SO of the signal processing circuit 9 shown in FIG. 2(L) is sequentially obtained in synchronism with the clock signals $\phi_{CLK}$ and $\overline{\phi}_{CLK}$ shown in FIGS. 2(A) and 2(B) because bit numbers "1" through "5" and "1725" through "1728" shown in FIGS. 2(C) through 2(K) are respectively outputted from the driving circuit 5. FIGS. 3(A) and 3(B) respectively show an output signal CVO of the C/V converting circuit 6 and an output signal PHO of the peak holding circuit 7. In other words, a voltage in correspondence with the intensity of the light is read by the peak holding circuit 7, and the output signal PHO of the peak holding circuit 7 is converted into the digital data (sensor output) SO describing the gradation levels of the document image.

FIG. 4 shows a perspective view of the conventional contact type image sensor 10. The photoelectric conversion elements 1 are arranged in a line on a transparent dielectric substrate 11 such as a silicon substrate so as to constitute the photodetector 2. The analog switch part 3, the buffer part 4 and the driving circuit 5 are formed on the substrate 11 to constitute a driving circuit part 12.

Each of the photoelectric conversion elements 1 have a sandwich structure shown in FIG. 5. A protection layer 13, an insulator layer 14 and a metal electrode layer 15 are successively formed on the substrate 11, and a semiconductor layer 16, a protection layer 17 and a transparent electrode layer 18 are further provided as shown. For example, the semiconductor layer 16 is made of amorphous Si including H or amorphous Si including OH.

On the other hand, the driving circuit part 12 has a metal oxide semiconductor (MOS) inverter structure using polysilicon for an activation layer (planar thin film transistor structure) as shown in FIGS. 6A and 6B, where FIG. 6A shows a plan view and FIG. 6B shows a cross sectional view of the driving circuit part 12. An activation layer 20 is patterned on the substrate 11, and a $p^+$-type diffusion layer 21 is formed on both sides of the activation layer 20. A gate oxide layer 22 is formed on the activation layer 20, and a gate electrode 23 is formed on the gate oxide layer 22. An insulator layer 24 covers the exposed gate oxide layer 22 and the like on the substrate 11. A contact hole 25 is formed in a portion of the insulator layer 24, and a metal electrode 26 is formed on the insulator layer 24 to electrically connect to the $p^+$-type diffusion layer 21 through the contact hole 25. Hence, the analog switch part 3 has a p-type MOS structure. The driving circuit 5 has an n-type MOS structure and is located adjacent to the analog switch part 3. The driving circuit 5 basically uses the same structure as the analog switch part 3 except that a portion corresponding to the $p^+$-type diffusion layer 21 is an $n^+$-type diffusion layer 27 in the driving circuit 5. The surface of the driving circuit part 12 is covered by a protection layer (not shown).

Therefore, the driving circuit 5 and the like of the contact type image sensor 10 are integrally formed on the transparent substrate 11 by use of thin film transistors or the like. However, in order to drive one photoelectric conversion element 1, that is, with respect to one bit of the photodetector 2, it is necessary to provide twenty or more thin film transistors. As a result, in the case of the contact type image sensor designed to read a document of A4 size, for example, it is necessary to provide a large number of photoelectric conversion elements 1 amounting to 1728 bits (=8 bits/mm×216 mm), and 34560 (=1728 bits×20) or more transistors are required to drive such a large number of photoelectric conversion elements 1.

But it is extremely difficult to form such a large number of transistors on the substrate 11 in a satisfactory state because it is difficult to form a perfectly uniform thin film on such a large area of the substrate 11 that is sufficient to provide the large number of transistors. For this reason, there is a problem in that the yield of the conventional contact type image sensor is poor. In addition, even when a single transistor of the driving circuit 5 fails, there is a problem in that the driving circuit 5 thereafter carries out an erroneous operation or the driving circuit 5 does not operate at all.

SUMMARY OF THE INVENTION

Accordingly, it is a general object of the present invention to provide a novel and useful contact type image sensor in which the problems described heretofore are eliminated.

Another and more specific object of the present invention to provide a contact type image sensor in which a driving circuit part of the image sensor is constituted by a small number of transistors. According to the contact type image sensor of the present invention, the image sensor is compact, the production cost is low and the yield is greatly improved over that of the conventional contact type image sensor because the transistors of the driving circuit part occupy a relatively small area of a substrate on which the image sensor is based.

Still another object of the present invention is to provide a contact type image sensor of a first type comprising a photodetector made up of a plurality of photoelectric conversion elements, switching mean including a plurality of switches respectively coupled to the photoelectric conversion elements of the photodetector, gate means including a plurality of logic gates respectively coupled to the switches of the switching means, driving means including first and second shift registers coupled to the gate means for sequentially driving the photoelectric conversion elements of the photodetector through the switching means and a synchronizing circuit for synchronizing operation timings of the first and second shift registers, and a substrate on which each of the photodetector, the switching means, the gate means and the driving means are integrally provided. The first shift register sequentially drives the photoelectric conversion elements in blocks through the gate means and the switching means, where each of the blocks have an arbitrary number of the photoelectric conversion elements, and the second shift register sequentially drives the photoelectric conversion elements within one block driven by the first shift register through the gate means and the switching means.

A further object of the present invention is to provide a contact type image sensor of a second type comprising a photodetector made up of a plurality of photoelectric conversion elements, switching means including a plurality of switches respectively coupled to the photoelectric conversion elements of the photodetector, driving means including first and second shift registers coupled to the switching means for sequentially driving the photoelectric conversion elements of the photodetector through the switching means and a synchronizing circuit for synchronizing operation timings of the first and second shift registers, and a substrate on which each of the photodetector, the switching means and the driving means are integrally provided. The first shift register sequentially selects and passes outputs of the photoelectric conversion elements in blocks through the switching means, where each of the blocks have an arbitrary number of the photoelectric conversion elements, and the second shift register sequentially drives the photoelectric conversion elements within one block selected by the first shift register through the switching means.

Another object of the present invention is to provide a contact type image sensor of either one of the above described first and second types wherein third and fourth shift registers are additionally provided as a back up for the first and second shift registers. According to the contact type image sensor of the present invention, it is possible to use the third and/or fourth shift registers when the first and/or second shift registers fail.

Other objects and further features of the present invention will be apparent from the following detailed description when read in conjunction with the accompanying drawings.

BRIEF DESCRIPTION OF THE DRAWINGS

FIGS. 2(A) through 2(L) and FIGS. 3(A) and 3(B) are timing charts for explaining the operation of the conventional image sensor shown in FIG. 1;

FIGS. 9A through 9C are perspective views respectively showing embodiments of the structure of the first embodiment;

FIGS. 10 and 11 are cross sectional views respectively showing embodiments of a thin film resistor used to constitute the shift register or the like of the contact type image sensor according to the present invention;

FIGS. 31A and 31B are perspective views respectively showing embodiments of the structure of the contact type image sensor of the tenth embodiment.

DETAILED DESCRIPTION

Figure 7:
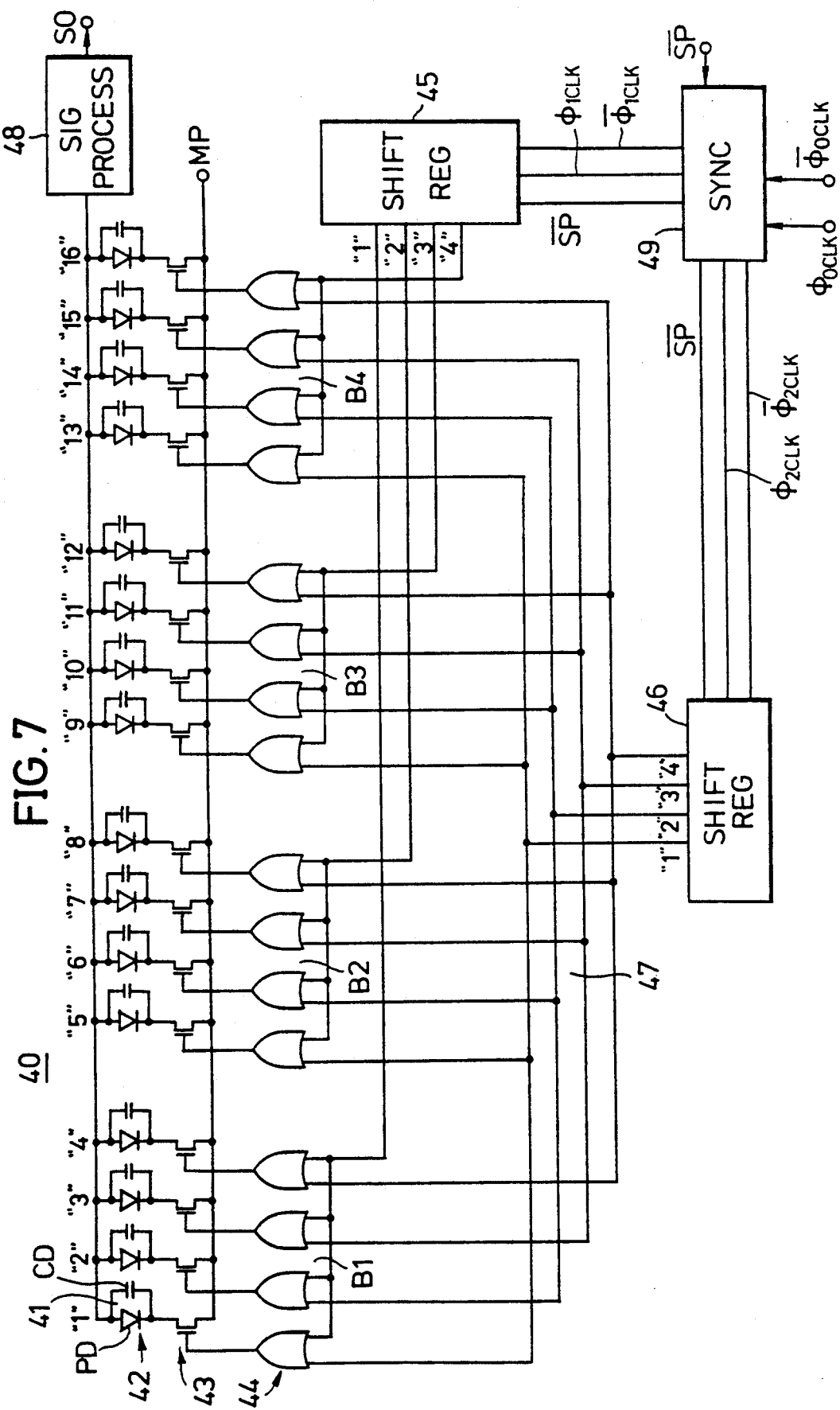
FIG. 7 is a system block diagram showing a first embodiment of a contact type image sensor according to the present invention.

FIG. 7 shows a circuit construction of a first embodiment of a contact type image sensor according to the present invention. A contact type image sensor 40 has a photodetector 42 made up of a plurality of photoelectric conversion elements 41, an analog switch part 43 made up of a plurality of switches, an OR gate part 44 made up of a plurality of OR gates, shift registers 45 and 46, a matrix interconnection (wiring) circuit 47, a signal processing circuit 48 and a synchronizing circuit 49. In this embodiment, the photodetector 42 has sixteen (16) photoelectric conversion elements 41 which are grouped into four photoelectric conversion element groups respectively having four photoelectric conversion elements 41. The switches of the analog switch part 43 and the OR gates of the OR gate part 44 are similarly grouped into four groups. First terminals of the photoelectric conversion elements 41 are connected to the corresponding switches of the analog switch part 43. The four groups will hereinafter be referred to as blocks B1 through B4.

Each photoelectric conversion element 41 is shown as having a photodiode structure with a photodiode PD and a sensor capacitance CD connected in parallel. A switch of the switch part 43 and an OR gate of the OR gate part 44 are provided in correspondence with each photoelectric conversion element 41. A driving circuit is constituted by the shift registers 45 and 46 and sequentially operates the switches of the analog switch part 43 responsive to clock signals $\phi_{0CLK}$ and $\bar{\phi}_{0CLK}$ and a start pulse signal $\overline{SP}$ so as to selectively drive the photoelectric conversion elements 41. The shift registers 45 and 46 are coupled to the OR gate part 44 through the matrix interconnection circuit 47. The shift register 45 is used to select the block of the OR gate part 44, while the shift register 46 is used to select one of the OR gates within the selected block of the OR gate part 44. Hence, each bit of the shift register 45 is coupled in common to first terminals of all of the OR gates of a corresponding one of the blocks B1 through B4 of the OR gate part 44, while each bit of the shift register 46 is coupled to a second terminal of a corresponding OR gate in each of the blocks B1 through B4 of the OR gate part 44. MP denotes a power source voltage for the photodetector 42.

The signal processing circuit 48 is connected in common to second terminals of the photoelectric conversion elements 41. Similarly as in the case of the conventional contact type image sensor described before, the signal processing circuit 48 has a current-to-voltage (C/V) converting circuit, a peak holding circuit (or an integrating circuit) and an analog-to-digital (A/D) converter which are not shown in FIG. 7.

The synchronizing circuit 49 synchronizes the operating timings of the two shift registers 45 and 46. In other words, the synchronizing circuit 49 controls the shift registers 45 and 46 by supplying the start pulse signal $\overline{SP}$ and clock signals $\phi_{1CLK}$ and $\bar{\phi}_{1CLK}$ to the shift register 45 and supplying the start pulse signal $\overline{SP}$ and clock signals $\phi_{2CLK}$ and $\bar{\phi}_{2CLK}$ to the shift register 46 based on the start pulse signal $\overline{SP}$ and the clock signals $\phi_{0CLK}$ and $\bar{\phi}_{0CLK}$.

Figure 8:
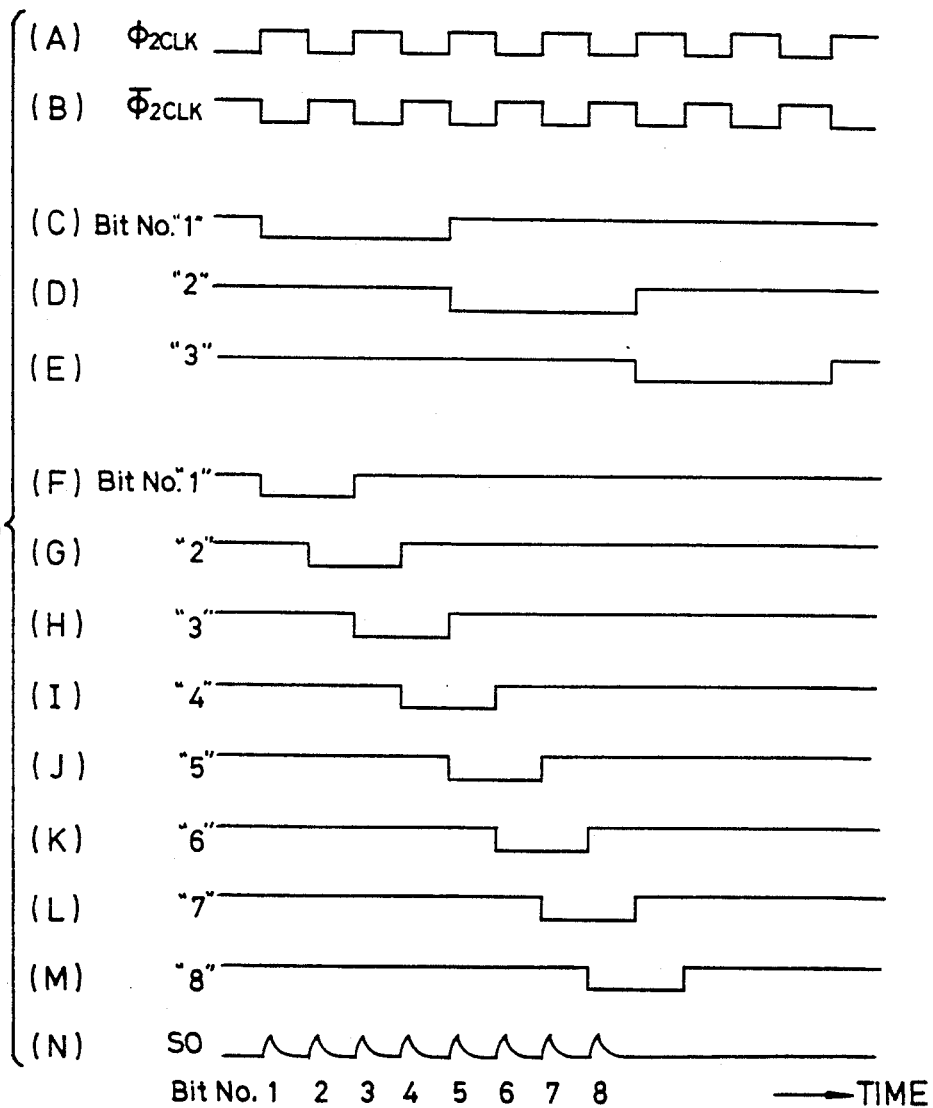
FIGS. 8(A) through 8(N) are timing charts for explaining the operation of the first embodiment.

FIGS. 8(A) and 8(B) respectively show the clock signals $\phi_{2CLK}$ and supplied to the shift register 46. FIGS. 8(C) through 8(E) respectively show bit numbers "1" through "3" of the shift register 45, and FIGS. 8(F) through 8(M) respectively show bit numbers "1" through "8" of the OR gate part 44 used to sequentially switch the switches of the analog switch part 43. An output signal SO of the signal processing circuit 48 shown in FIG. 8(N) is sequentially obtained in synchronism with the clock signals $\phi_{0CLK}$ and $\bar{\phi}_{0CLK}$. Accordingly, the block of photoelectric conversion elements 41 is selected by the output of the shift register 45, and each photoelectric conversion element 41 within the selected block is sequentially selected by the output of the shift register 46.

In the case of the contact type image sensor designed to read a document of A4 size, for example, it is necessary to provide a number of photoelectric conversion elements 41 amounting to 1728 bits (=8 bits/mm×216 mm). Hence, when the shift register 45 has four (4) bits, the shift register 46 requires 432 (=1728/4) bits, and only a total of 436 bits are required by the two shift registers 45 and 46. When the shift register 45 has eight (8) bits, the shift register 46 requires 216 bits, and only a total of 224 bits are required by the two shift registers 45 and 46. In addition, when the shift register 45 has sixteen (16) bits, the shift register 46 requires 108 bits, and only a total of 124 bits are required by the two shift registers 45 and 46. Further, when the shift register 45 has thirty-two (32) bits, the shift register 46 requires 54 bits, and only a total of 86 bits are required by the two shift registers 45 and 46. Therefore, the total number of bits required by the shift registers 45 and 46 and the synchronizing circuit 49 is in a range of 100 bits to 450 bits and is greatly reduced to the conventional contact type image sensor in which the shift register alone requires a total of 1728 bits as described before.

Thus, according to this embodiment, it is possible to greatly reduce the area occupied by the two shift registers 45 and 46 compared to the area occupied by the single shift register of the conventional contact type image sensor. As a result, it is that much easier to integrate other circuit elements such as an operational amplifier on a substrate together with the shift registers (driving circuit), and the image sensor can be made compact.

In addition, because this embodiment uses the OR gate part 44, the matrix interconnection circuit 47 can be realized within the driving circuit constituted by the shift registers 45 and 46, without the need to provide the matrix interconnection structure on the output side of the photoelectric conversion elements 41. For this reason, it is possible to realize a matrix drive without deteriorating the signal-to-noise (S/N) ratio of the output data of the image sensor.

FIGS. 9A through 9C are perspective views respectively showing embodiments of the structure of the image sensor shown in FIG. 7. In FIG. 9A, the photodetector 42 is formed on a transparent dielectric substrate 61, and the shift registers 45 and 46 are formed adjacent to respective ends of the photodetector 42. Terminals 62 for connecting the image sensor to an external circuit or device are coupled to the shift registers 45 and 46. In FIG. 9B, the signal processing circuit 48 is formed in place of the terminals 62 shown in FIG. 9A. The signal processing circuit 48 has two stages of operational amplifiers 63 and 64 constituting the C/V converting circuit, the peak holding circuit and the A/D converter. In FIG. 9C, the shift registers 45 and 46 are provided on the respective ends of the photodetector 42, and the width of the image sensor can be made small. As may be seen from the embodiments shown in FIGS. 9A through 9C, the layout of the elements constituting the image sensor can be designed with a large degree of freedom because the shift registers 45 and 46 occupy only a small area on the substrate 61.

Especially in the case of the embodiment shown in FIG. 9B, by use of thin film transistors it is possible to integrally form the analog switch part 43, the OR gate part 44, the shift registers 45 and 46, the signal processing circuit 48 and the synchronizing signal 49 on the same substrate 61 on which the photodetector 42 is formed.

Figure 1:
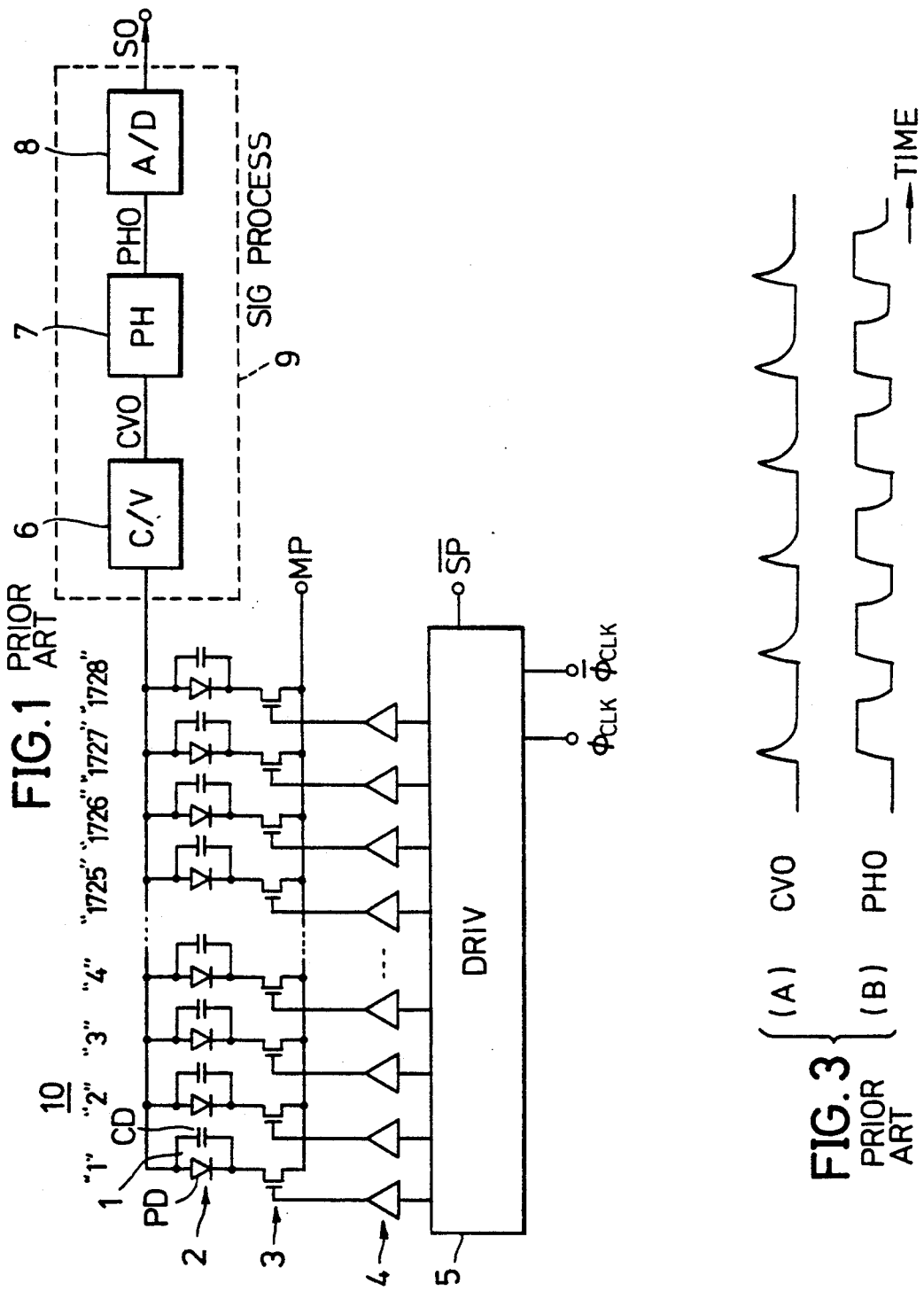
FIG. 1 is a system block diagram showing an example of a conventional contact type image sensor.
Figure 2:
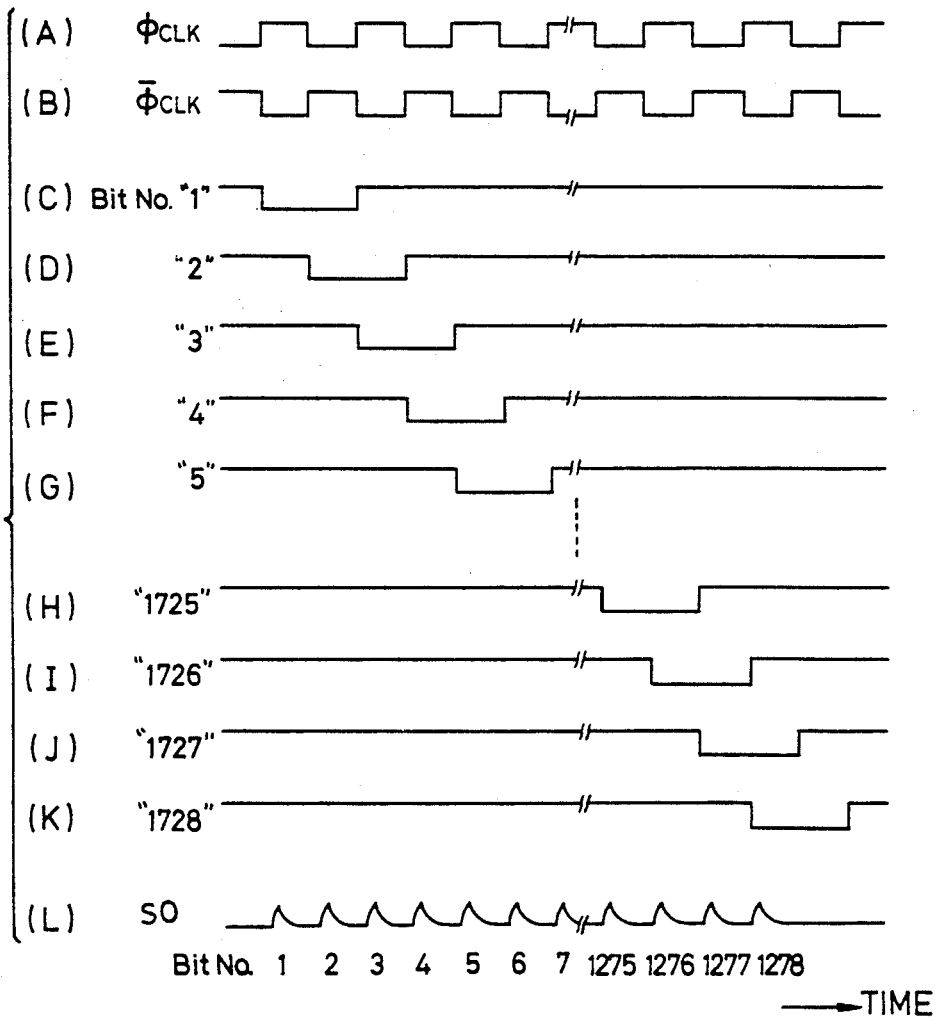
Figure 4:
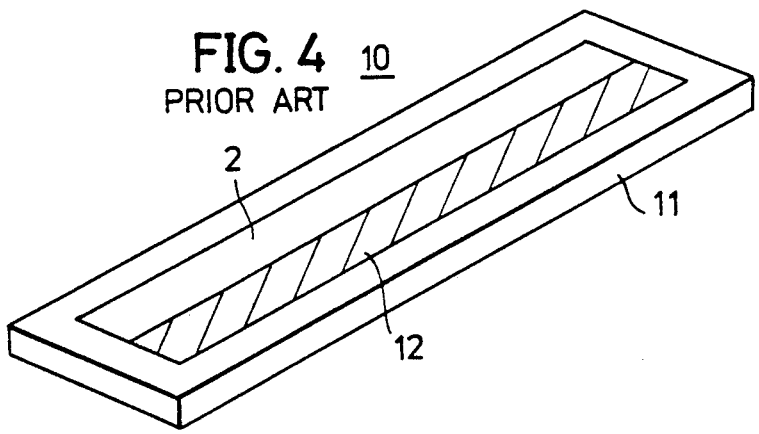
FIGS. 4 and 5 are a perspective view and a cross sectional view respectively showing the conventional image sensor shown in FIG. 1.
Figure 5:
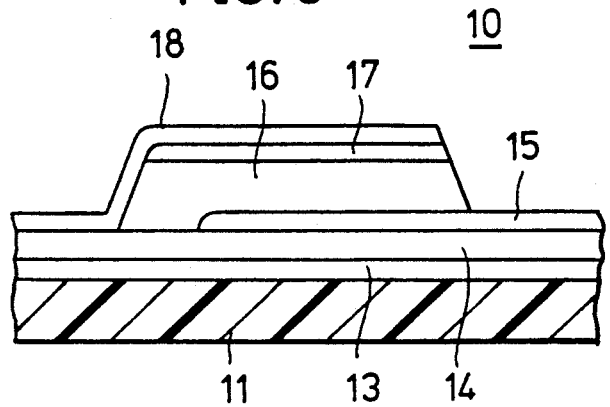

Each photoelectric conversion element 41 of the photodetector 42 may have the sandwich structure shown in FIG. 5 described before. For example, the protection layers 13 and 17 are made of $SiO_2$ or $Si_3N_4$, the insulator layer 14 is made of $SiO_2$, $Si_3N_4$ or amorphous Si including H, the metal electrode layer 15 is made of Cr, the semiconductor layer 16 is made of amorphous Si including OH, and the transparent electrode layer 18 is made of indium tin oxide (ITO).

Figure 11:
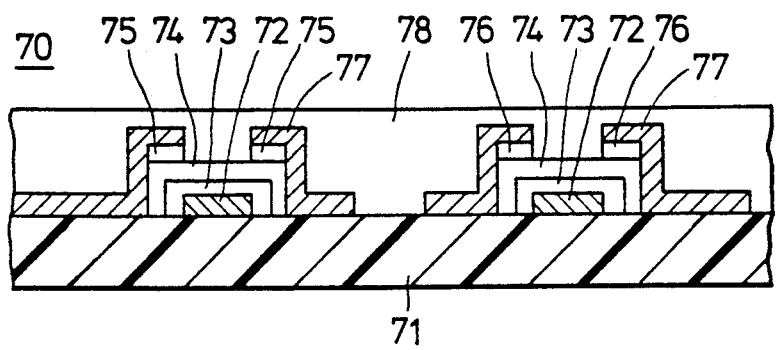

On the other hand, a planar thin film transistor 65 shown in FIG. 10 or a reverse staggered thin film transistor 70 shown in FIG. 11 may be used as the thin film transistors constituting the shift registers 45 and 46 and the like. In FIGS. 10 and 11, those parts which are the same as those corresponding parts in FIGS. 7 and 9A through 9C are designated by the same reference numerals, and a description thereof will be omitted.

Figure 6A:
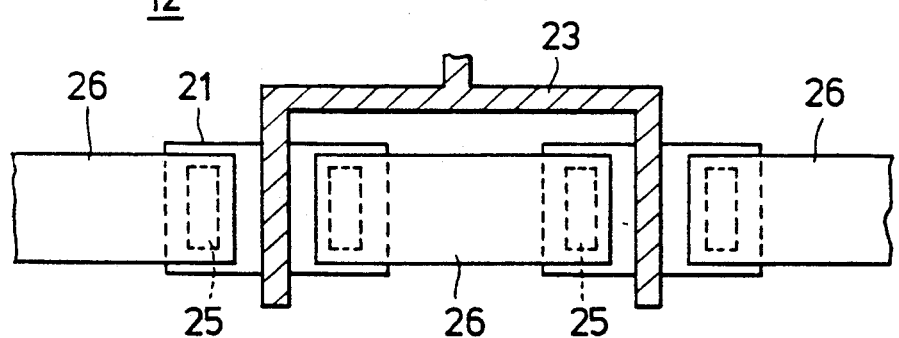
FIGS. 6A and 6B are a plan view and a cross sectional view respectively showing a driving circuit part of the conventional image sensor shown in FIG. 1.
Figure 6B:
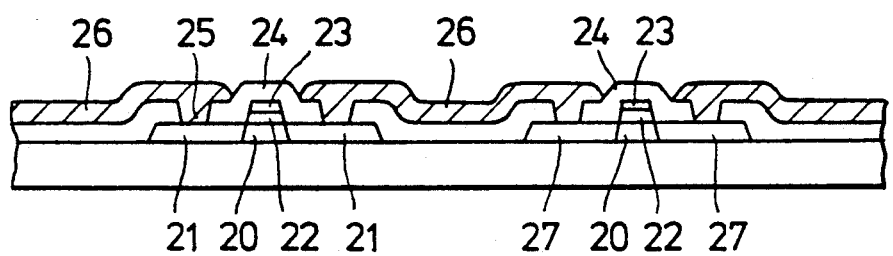

In the planar thin film transistor 65 shown in FIG. 10, those parts which are essentially the same as those corresponding parts in FIGS. 6A and 6B are designated by the same reference numerals. For example, the activation layer 20 is made of polysilicon, the $p^+$-type diffusion layer 21 is made of polysilicon doped with boron, the $n^+$-type diffusion layer 27 is made of polysilicon doped with phosphor, the gate oxide layer 22 is made of $SiO_2$, the gate electrode 23 is made of polysilicon, the insulator layer 24 and the protection layer 28 are made of $SiO_2$ or $Si_3N_4$, and the metal electrode layer 26 is made of Al, AlSo, AlSiCu, Mo or the like.

In the reverse staggered thin film transistor 70 shown in FIG. 11, the structure is basically similar to that of the planar thin film transistor 65 except that the stacking order is different. In other words, a gate electrode layer 72 made of Cr, Mo, NiCr or the like is formed on a transparent dielectric substrate 71 made of silicon or the like. A gate oxide layer (gate insulator layer) 73 made of $SiO_2$ or $Si_3N_4$ is formed on the gate electrode layer 72, and an activation layer 74 made of amorphous Si is formed on the gate oxide layer 73. A $p^+$-type diffusion layer 75 made of amorphous Si doped with boron and an $n^+$-type diffusion layer 76 made of amorphous Si doped with phosphor are formed on the activation layer 74 with a predetermined pattern to respectively form a p-channel and an n-channel. A metal electrode layer 77 made of Al, NiCr, Mo or the like is formed on the diffusion layers 75 and 76, and a protection layer 78 made of $SiO_2$ or $Si_3N_4$ thereafter covers the layers on the substrate 71 for protection.

Figure 12:
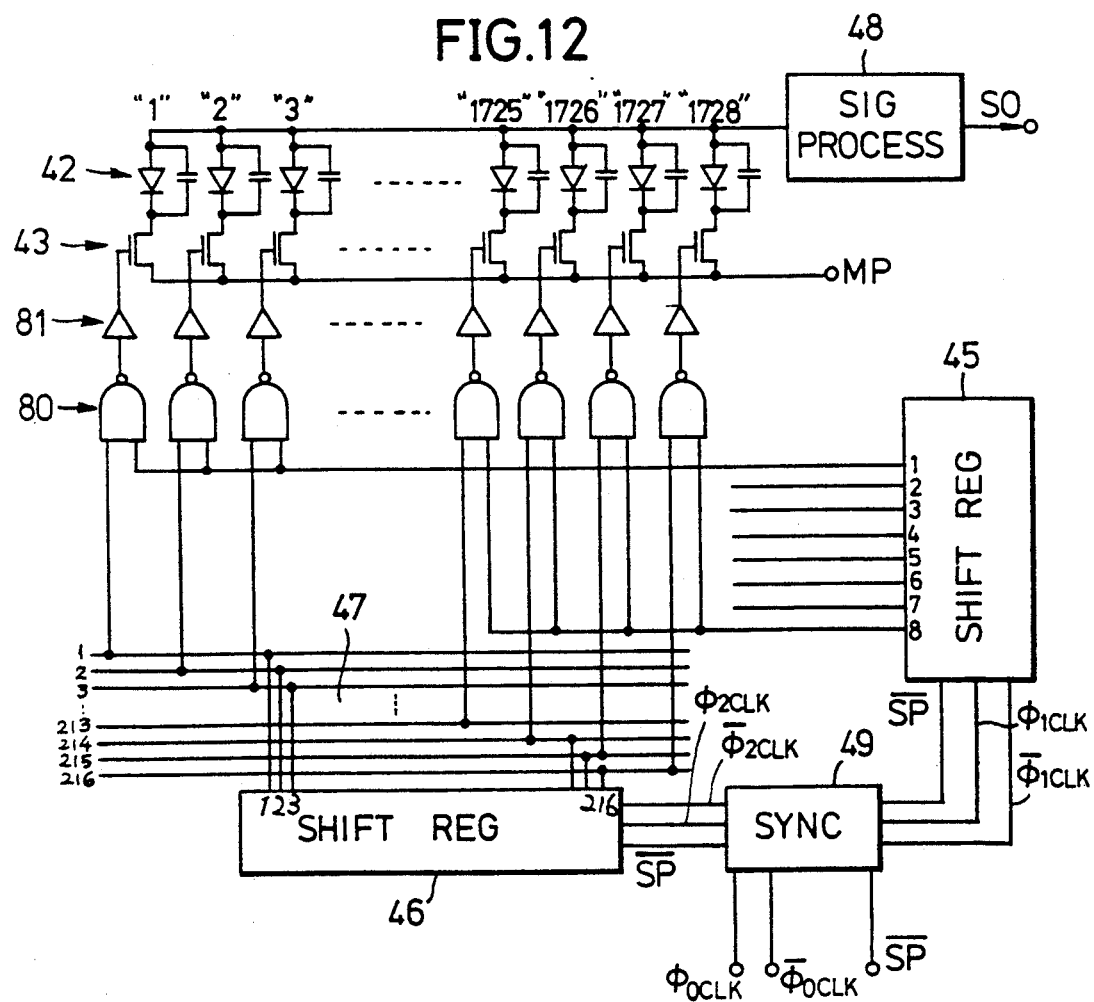
FIG. 12 is a system block diagram showing a second embodiment of the contact type image sensor according to the present invention.
Figure 13:
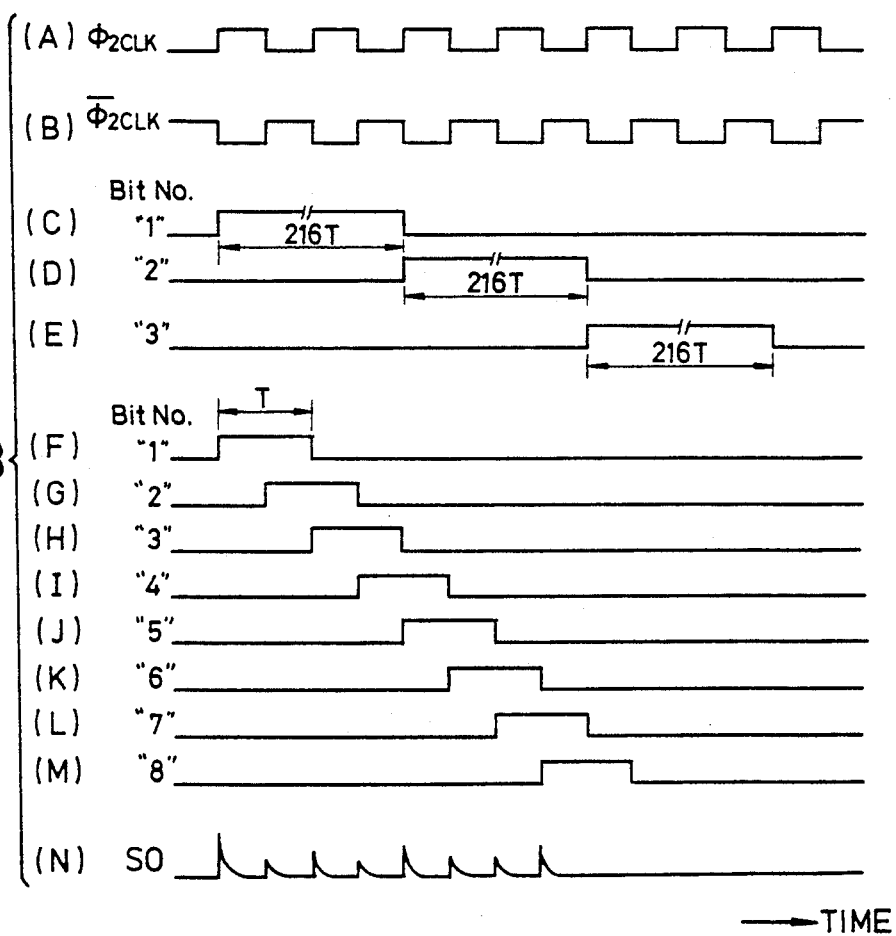
FIGS. 13(A) through 13(N) are timing charts for explaining the operation of the second embodiment.

Next, a description will be given of a second embodiment of the contact type image sensor according to the present invention. FIG. 12 shows the second embodiment of the contact type image sensor according to the present invention, and FIGS. 13(A) through 13(N) are timing charts for explaining the operation of the second embodiment. In FIG. 12, those parts which are essentially the same as those corresponding parts in FIG. 7 are designated by the same reference numerals, and a description thereof will be omitted.

In this embodiment, a NAND gate part 80 made up of a plurality of NAND gates and a buffer part 81 made up of a plurality of buffers are provided in place of the OR gate part 44 of the first embodiment. In this embodiment, the photodetector 42 has 1728 photoelectric conversion elements 41 which are grouped into eight (8) photoelectric conversion element groups (blocks) respectively having 216 photoelectric conversion elements 41. The shift register 45 has 8 bits, and the shift register 46 has 216 bits.

FIGS. 13(A) and 13(B) respectively show the clock signals $\phi_{2CLK}$ and $\overline{\phi}_{2CLK}$ supplied to the shift register 46. FIGS. 13(C) through 13(E) respectively show bit numbers "1" through "3" of the shift register 45, and FIGS. 13(F) through 13(M) respectively show bit numbers "1" through "8" of the shift register 46 used to sequentially switch the switches of the analog switch 43 through the NAND gate part 80 and the buffer part 81. An output signal SO of the signal processing circuit 48 shown in FIG. 13(N) is sequentially obtained in synchronism with the clock signals $\phi_{OCLK}$ and $\overline{\phi}_{OCLK}$. When the signals supplied to one NAND gate of the NAND gate part 80 from the shift registers 45 and 46 both become high-level signals, an output signal of this NAND gate becomes a low-level signal and a corresponding one of the switches of the analog switch part 43 is turned ON thereby selecting a corresponding one of the photoelectric conversion elements 41 of the photodetector 42. The light receiving state of the selected photoelectric conversion element 41 is thus detected. Accordingly, the block of photoelectric conversion elements 41 is selected by the output of the shift register 45, and each photoelectric conversion element within the selected block is sequentially selected by the output of the shift register 46. In FIGS. 13(A) through 13(N), $\underline{T}$ denotes a period of the clock signals $\phi_{2CLK}$ and $\bar{\phi}_{2CLK}$.

Figure 14:
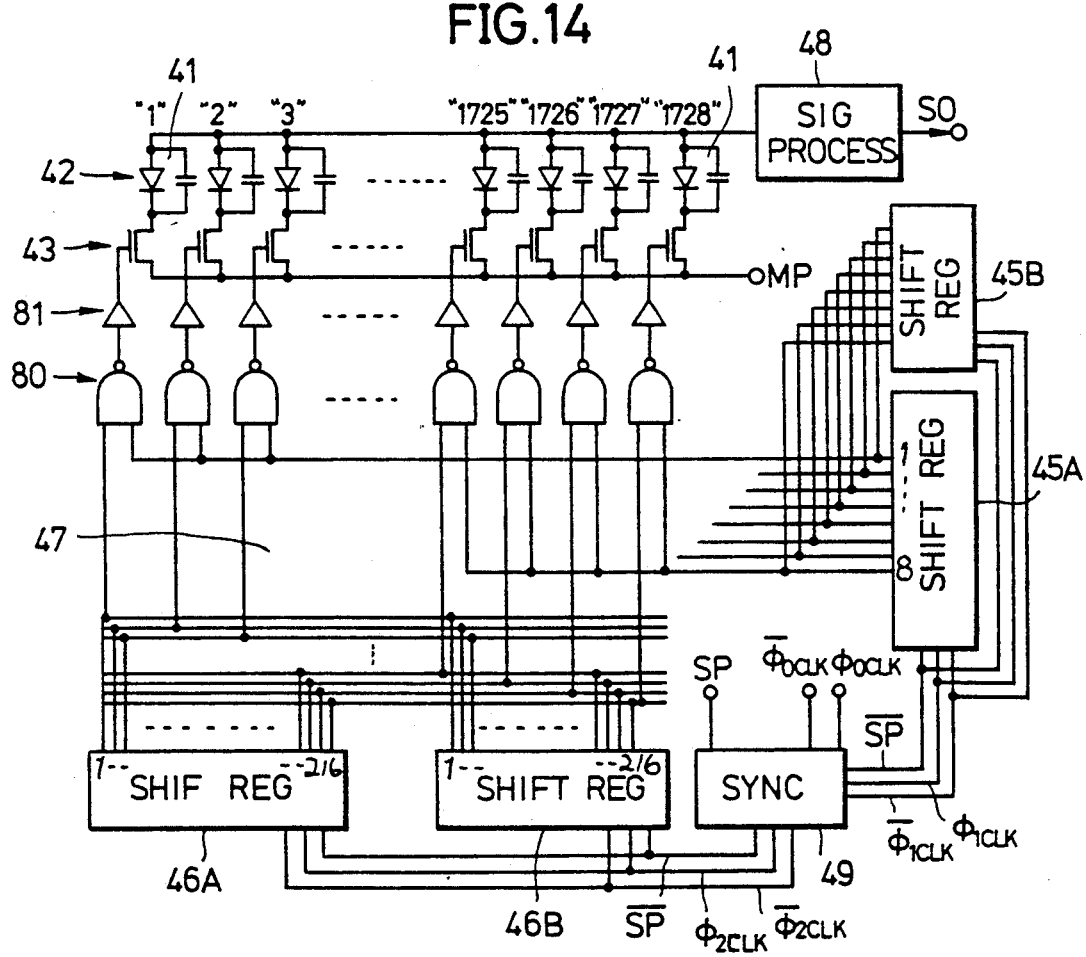
FIG. 14 is a system block diagram showing a third embodiment of the contact type image sensor according to the present invention.

Next, a description will be given of a third embodiment of the contact type image sensor according to the present invention. FIG. 14 shows the third embodiment of the contact type image sensor according to the present invention. In FIG. 14, those parts which are essentially the same as those corresponding parts in FIG. 12 are designated by the same reference numerals, and a description thereof will be omitted. In the second embodiment, the image sensor may carry out an erroneous operation or may not operate at all when at least one of the shift registers 45 and 46 fails. A failure of the shift register may be caused by a single bit thereof. Hence, in this third embodiment, a pair of shift registers 45A and 45B is provided in place of the shift register 45, and a pair of shift registers 46A and 46B is provided in place of the shift register 46. Hence, when one of the pair of registers 45A and 45B (or 46A and 46B) fails, it is possible to use the other. Because it is possible to greatly reduce the area occupied by the shift registers in the present invention, it is possible to provide such redundant or auxiliary shift registers and the total area occupied by the shift registers including the redundant shift registers is still considerably reduced compared to that of the conventional contact type image sensor.

For example, the shift registers 45A and 46A are initially used for the driving circuit of the image sensor. The shift registers 45A and 46A may be tested by inputting a test data therein and reading out the output signals to determine whether or not the actual output signals coincide with predetermined output signals which should be obtained responsive to the test data. When it is found from the test that the shift register 45A (46A) contains a defect, the shift register 45A (or 46A) is disconnected from the remaining part of the image sensor by cutting an interconnection, for example, and the shift register 45B (or 46B) is used in place of the defective shift register 45A (or 46A).

When the defective shift register (for example, the shift register 45A) remains connected to the remaining part of the image sensor, that is, to the normal (non-defective) shift register (for example, the shift register 45B), the defective shift register may interfere with the operation of the non-defective shift register. Such an interference includes a signal delay caused by a parasitic capacitance and a mixing of an erroneous signal due to an erroneous operation. For this reason, it is desirable that the shift registers 45A, 45B, 46A and 46B are connected to the remaining part of the image sensor by wire bonding or metal thin film interconnection so that the defective shift register may easily be disconnected from the non-defective shift register by cutting or destroying the wire bonding or metal thin film interconnection. The cutting may be carried out by heating the interconnection using a light beam or an electron beam, for example. It is of course possible to provide a switching means for disconnecting the defective shift register from the non-defective shift register.

Figure 15:
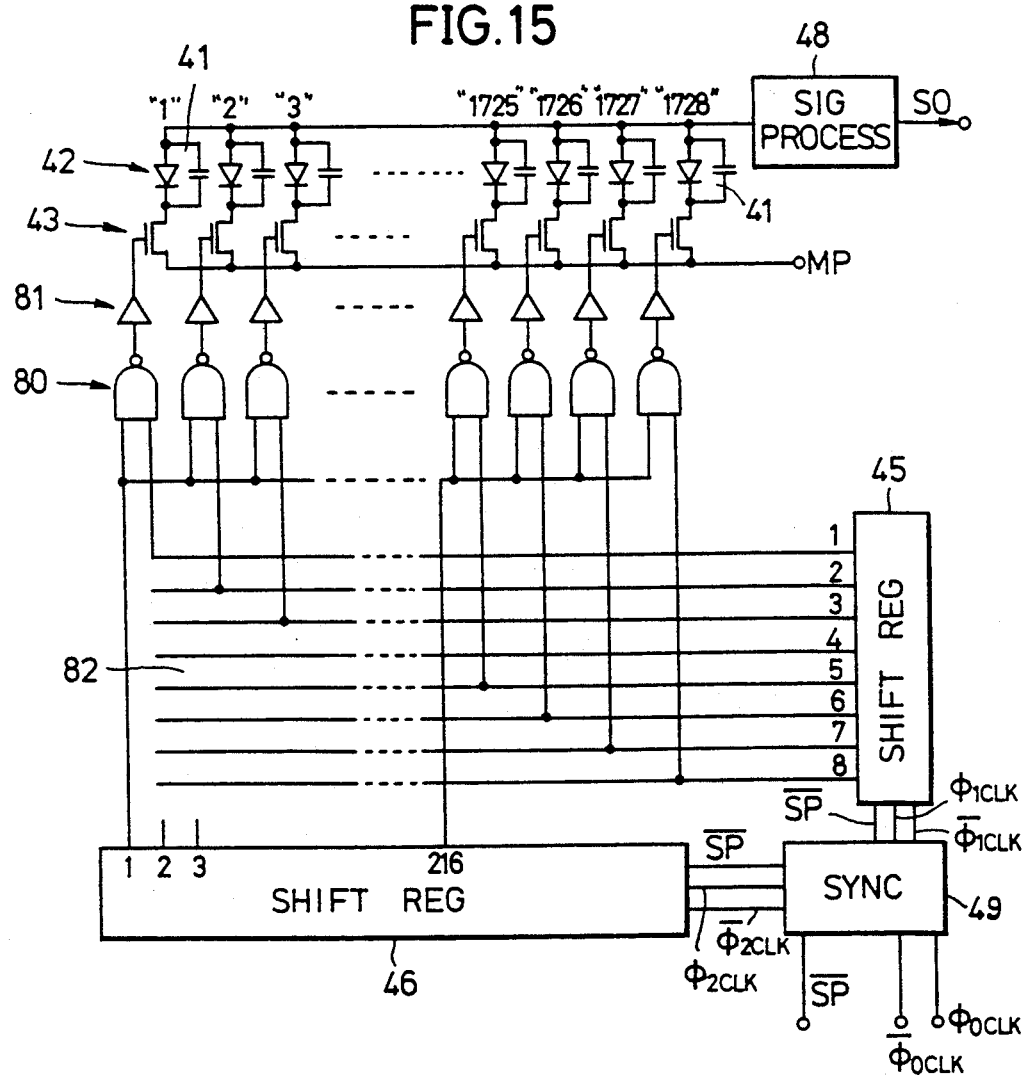
FIG. 15 is a system block diagram showing a fourth embodiment of the contact type image sensor according to the present invention.

Next, a description will be given of a fourth embodiment of the contact type image sensor according to the present invention. FIG. 15 shows the fourth embodiment of the contact type image sensor according to the present invention, and FIGS. 16(A) through 16(K) are timing charts for explaining the operation of the fourth embodiment. In FIG. 15, those parts which are essentially the same as those corresponding parts in FIG. 12 are designated by the same reference numerals, and a description thereof will be omitted. In the second embodiment described before, the matrix interconnection circuit 47 occupies a large area because of the large number of bits. For this reason, the image sensor cannot operate at a high speed because of the line capacitance between the interconnections and the resistance of the interconnections. Hence, in this fourth embodiment, a matrix interconnection circuit 82 is used in place of the matrix interconnection circuit 47 so as to reduce the area occupied by the matrix interconnection circuit and make it possible to operate the image sensor at a high speed.

The matrix interconnection circuit 82 supplies the output signals of the shift registers 45 and 46 to the NAND gate part 80 in conformance with a system different from that of the matrix interconnection circuit 47. In the case of the matrix interconnection circuit 47 of the second embodiment, 224 (=216+8) horizontal lines are required. However, in this fourth embodiment, the bits of the shift register 46 are connected to a common line which connects to one input terminal of each of the NAND gates of the NAND gate part 80. Hence, in this embodiment, four horizontal lines are provided in respect of the shift register 45 and one horizontal line is provided in respect of the shift register 46, that is, only nine horizontal lines are required.

Figure 16:
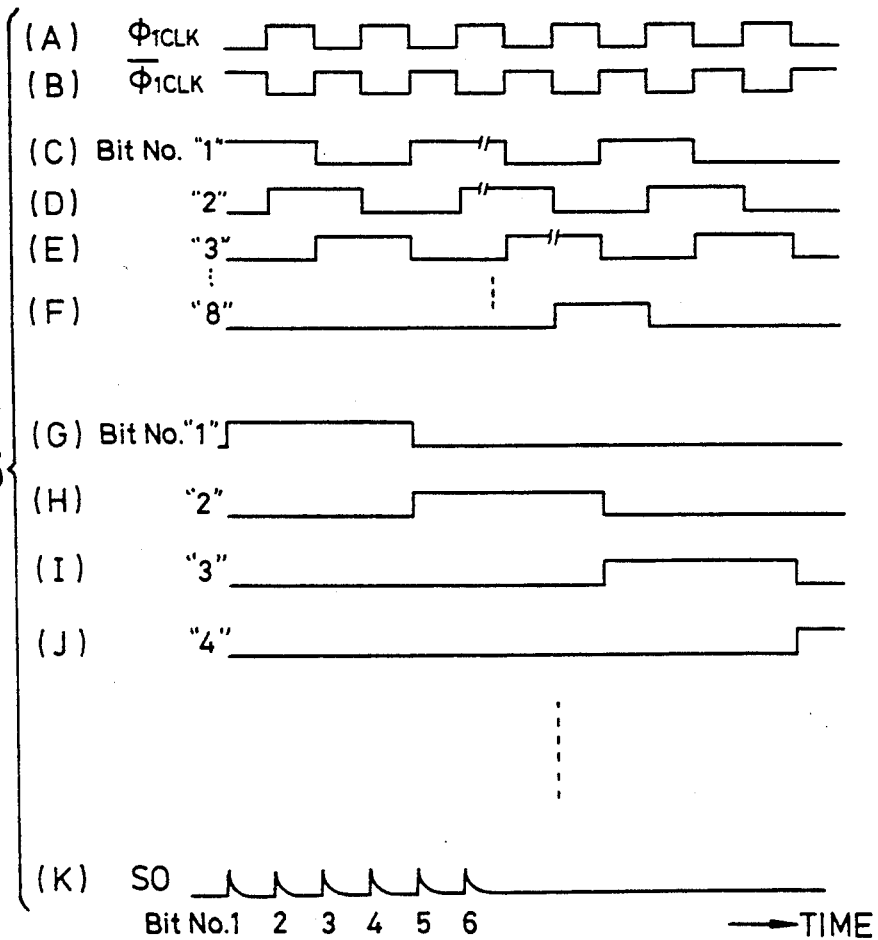
FIGS. 16(A) through 16(K) are timing charts for explaining the operation of the fourth embodiment.

In addition, according to this embodiment, the operation frequency of the shift register 45 is higher than the operation frequency of the shift register 46. FIGS. 16(A) and 16(B) respectively show the clock signals $\phi_{1CLK}$ and $\bar{\phi}_{1CLK}$ supplied to the shift register 45. FIGS. 16(C) through 16(F) respectively show bit numbers "1" through "3" and "8" of the shift register 45, and FIGS. 16(G) through 16(J) respectively show bit numbers "1" through "4" of the shift register 46 used to sequentially switch the switches of the analog switch 43 through the NAND gate part 80 and the buffer part 81. An output signal SO of the signal processing circuit 48 shown in FIG. 16(K) is sequentially obtained in synchronism with the clock signals $\phi_{0CLK}$ and $\bar{\phi}_{0CLK}$.

The operation frequency of the shift register 45 (frequency of the clock signals $\phi_{1CLK}$ and $\bar{\phi}_{1CLK}$) is ½ the frequency of the clock signals $\phi_{0CLK}$ and $\bar{\phi}_{0CLK}$, that is, ½ the frequency. The operation frequency of the shift register 46 (frequency of the clock signals $\phi_{2CLK}$ and $\bar{\phi}_{2CLK}$) is a low frequency which is 1/16 the sensor frequency. On the other hand, in the timing charts of FIGS. 13(A) through 13(N) described before in conjunction with the second embodiment, the operation frequency of the shift register 46 is ½ the sensor frequency and the operation frequency of the shift register 45 is 1/16 the sensor frequency.

Therefore, according to the fourth embodiment, a number of intersections in the matrix interconnection circuit 82 is small, and for this reason the line capacitance is small and the image sensor can operate at a high speed. It is possible to set the operation frequency of the shift register 46 to a low frequency which is 1/156 the sensor frequency, for example, to realize such a high-speed operation.

Next, a description will be given of a fifth embodiment of the contact type image sensor according to the present invention. The system block diagram of this fifth embodiment is identical to that of the first embodiment shown in FIG. 7. Hence, the description of the fifth embodiment will be given with reference to FIG. 7.

Figure 17:
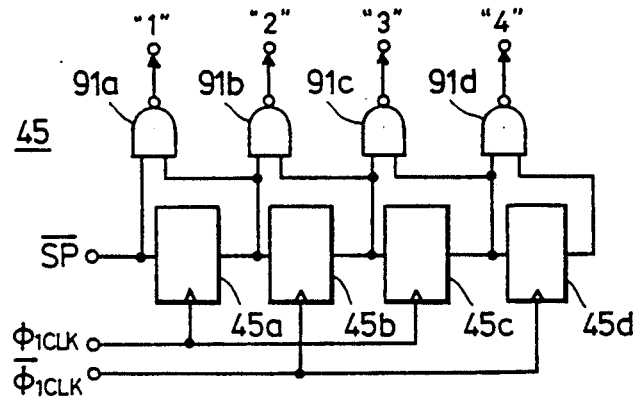
FIG. 17 is a circuit diagram showing an embodiment of a shift register of a fifth embodiment of the contact type image sensor according to the present invention.

FIG. 17 shows an embodiment of the shift register 45 of the fifth embodiment. The shift register 45 has four static or dynamic shift registers 45a through 45d and four NAND gates 91a through 91d which are connected as shown.

Figure 18:
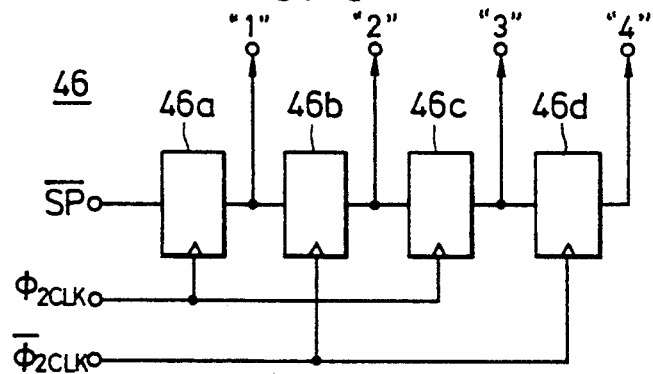
FIG. 18 is a circuit diagram showing an embodiment of another shift register of the fifth embodiment.

FIG. 18 shows an embodiment of the shift register 46 of the fifth embodiment. The shift register 46 has four static or dynamic shift registers 46a through 46d which are connected as shown.

Figure 19:
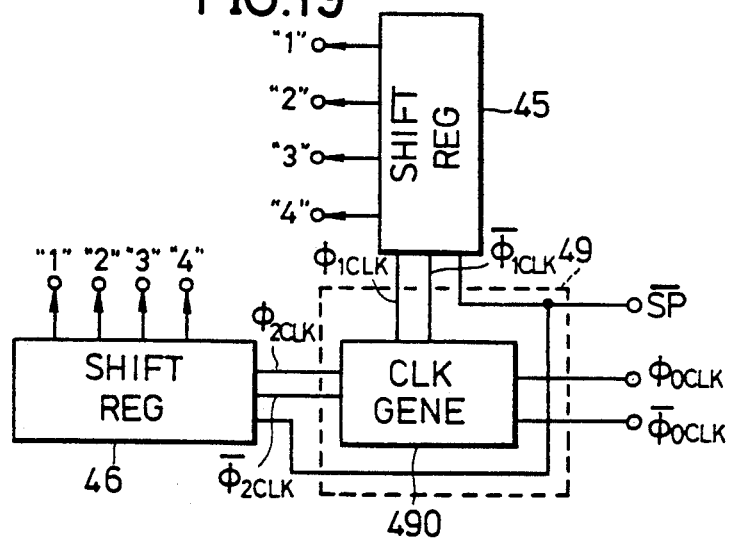
FIG. 19 is a system block diagram showing the shift registers and a synchronizing circuit of the fifth embodiment.
Figure 20:
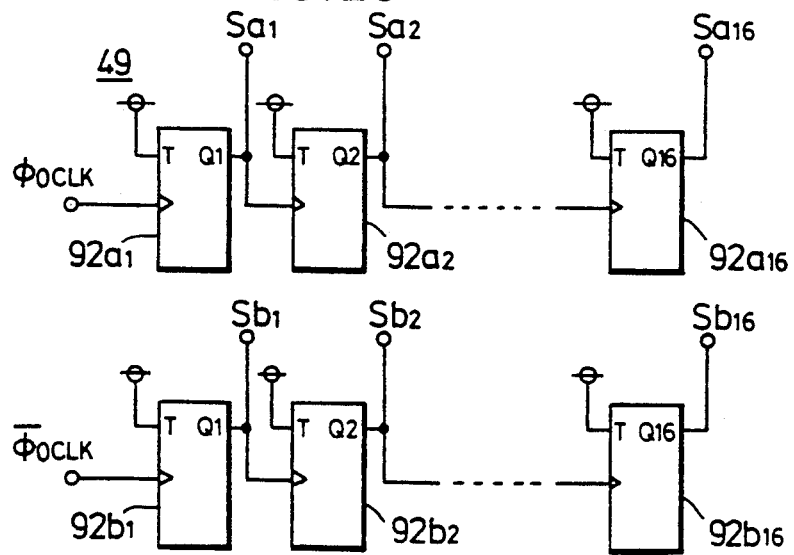
FIG. 20 is a circuit diagram showing an embodiment of the synchronizing circuit of the fifth embodiment.

FIG. 19 shows an essential part of the fifth embodiment including the shift registers 45 and 46 and the synchronizing circuit 49. The synchronizing circuit 49 has a clock generating circuit 490 for generating clock signals $\phi_{1CLK}$, $\overline{\phi_{1CLK}}$, $\phi_{2CLK}$ and $\overline{\phi_{2CLK}}$. FIG. 20 shows an embodiment of the synchronizing circuit 49.

Figure 24:
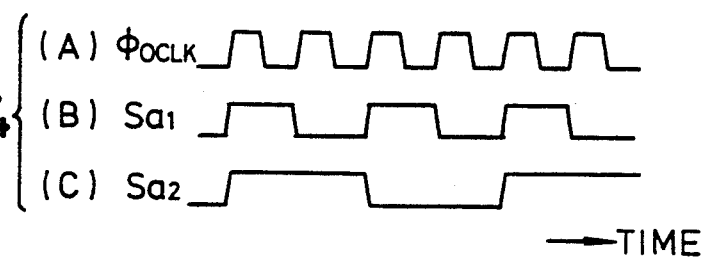
FIGS. 24(A) through 24(C) are timing charts for explaining the operation of the synchronizing circuit shown in FIG. 20.

In FIG. 20, the synchronizing circuit 49 has trigger flip-flops 92a1 through 92a16 and 92b1 through 92b16 which are connected as shown to constitute a frequency dividing circuit having a form of a binary counter. The flip-flops 92a1 through 92a16 respectively output signals Sa1 through Sa16 responsive to the clock signal $\phi_{0CLK}$, and the flip-flops 92b1 through 92b16 respectively output signals Sb1 through Sb16 responsive to the clock signal $\overline{\phi_{0CLK}}$. FIGS. 24(A), 24(B) and 24(C) respectively show the clock signal $\phi_{0CLK}$ and the signals Sa1 and Sa2. For example, predetermined two signals (for example, Sa1 and Sa2) out of the signals Sa1 through Sa16 are respectively used as the clock signals $\phi_{2CLK}$ and $\phi_{1CLK}$.

FIGS. 21(A) through 21(G) are timing charts for explaining the operation of the shift register 45, and FIGS. 22(A) through 22(F) are timing charts for explaining the operation of the shift register 46. In addition, FIGS. 23(A) through 23(M) are timing charts for explaining the operation of the driving circuit constituted by the shift registers 45 and 46. In FIGS. 21(A) through 21(G), 22(A) through 22(F) and 23(A) through 23(M), the same designations are used for the signals as in FIGS. 17 through 20.

Figure 21:
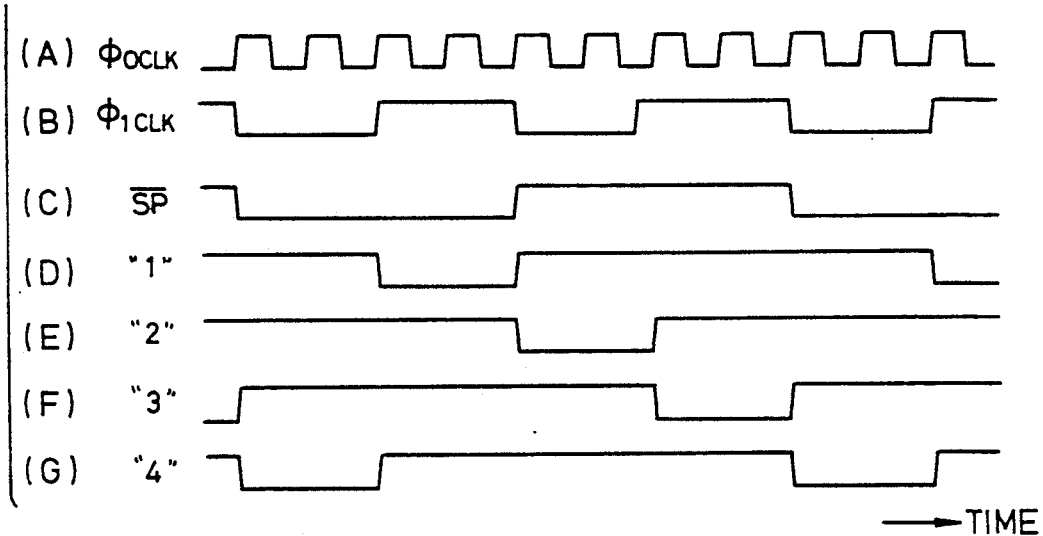
FIGS. 21(A) through 21(G) are timing charts for explaining the operation of the shift register shown in FIG. 17.
Figure 22:
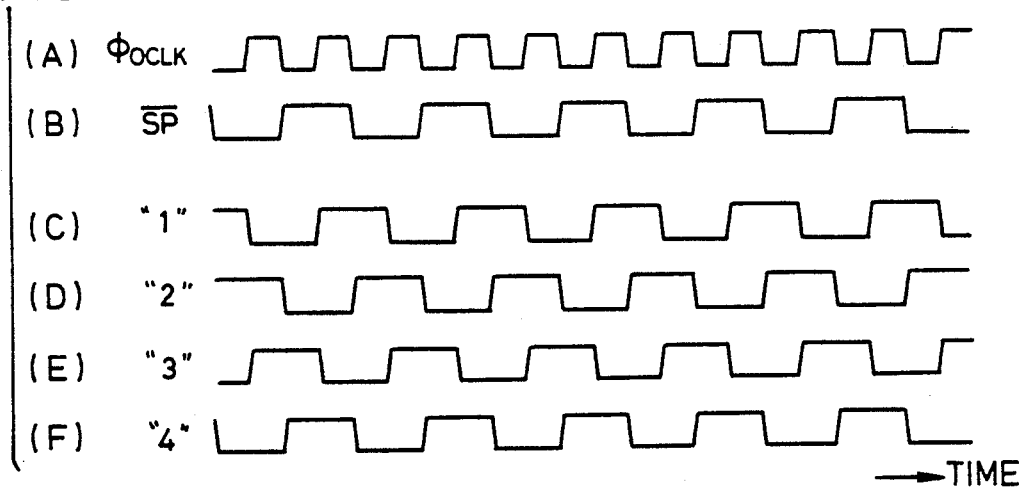
FIGS. 22(A) through 22(F) are timing charts for explaining the operation of the shift register shown in FIG. 18.

When the start pulse signal $\overline{SP}$ shown in FIG. 21(C) is applied to the shift register 45, the signals shown in FIGS. 21(D) through 21(G) are outputted from the bit numbers "1" through "4" of the shift register 45 in synchronism with the reference clock signal $\phi_{0CLK}$ shown in FIG. 21(A) and the clock signal $\phi_{1CLK}$ shown in FIG. 21(B). Similarly, when the start pulse signal $\overline{SP}$ shown in FIG. 22(B) is applied to the shift register 46, the signals shown in FIGS. 22(C) through (F) are outputted from the bit numbers "1" through "4" of the shift register 46 in synchronism with the reference clock signal $\phi_{0CLK}$ shown in FIG. 22(A) and the clock signal $\phi_{2CLK}$. Accordingly, when the output signals of the shift registers 45 and 46 are used, it is possible to sequentially drive the photoelectric conversion elements 41 of the photodetector 42 in synchronism with the reference clock signal $\phi_{0CLK}$ as may be seen from FIGS. 23(A) through 23(M).

Figure 23:
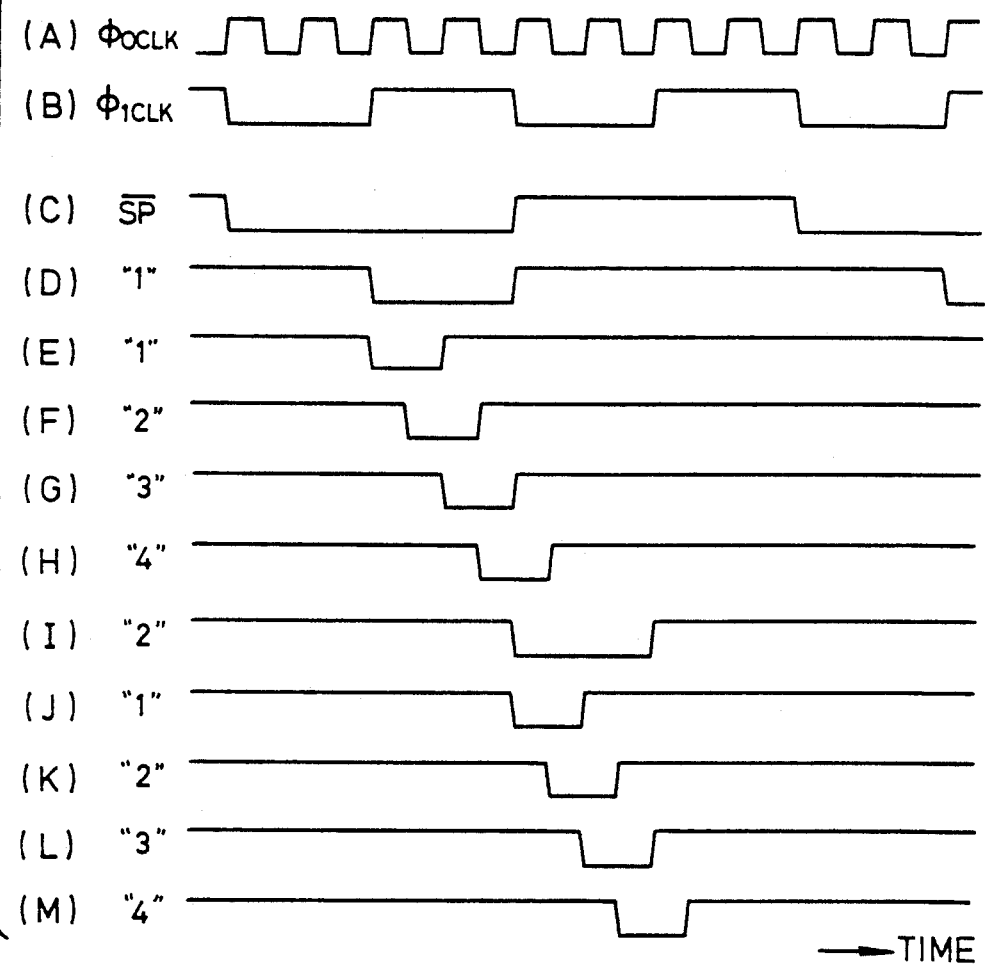
FIGS. 23(A) through 23(M) are timing charts for explaining the operation of a driving circuit constituted by the shift registers shown in FIGS. 17 and 18.

FIGS. 23(A) and 23(B) respectively show the clock signals $\phi_{0CLK}$ and $\phi_{1CLK}$. FIG. 23(C) shows the start pulse signal $\overline{SP}$ applied to the shift register 45 and FIG. 23(D) shows the output signal of the shift register 45 at the bit number "1". FIGS. 23(E) through 23(H) respectively show the output signals at the bit numbers "1" through "4" of the OR gate which receives the signal shown in FIG. 23(D). FIG. 23(I) shows the output signal of the shift register 45 at the bit number "2", and FIGS. 23(J) through 23(M) respectively show the output signals at the bit numbers "1" through "4" of the OR gate which receives the signal shown in FIG. 23(I).

In other words, the shift register 45 selects one of the blocks B1 through B4 of the OR gate part 44, and the shift register 46 sequentially selects each of the OR gates within the selected block of the OR gate part 44. Hence, the switches of the analog switch part 44 are sequentially switched to sequentially select the photoelectric conversion elements 41, and the digital data SO is outputted from the signal processing circuit 48 dependent on the output of the image sensor 40.

According to the fifth embodiment, it is possible to obtain substantially the same effects as those obtainable in the first embodiment. Further, the image sensor may have the structures described before in conjunction with FIGS. 9A through 9C.

Figure 25:
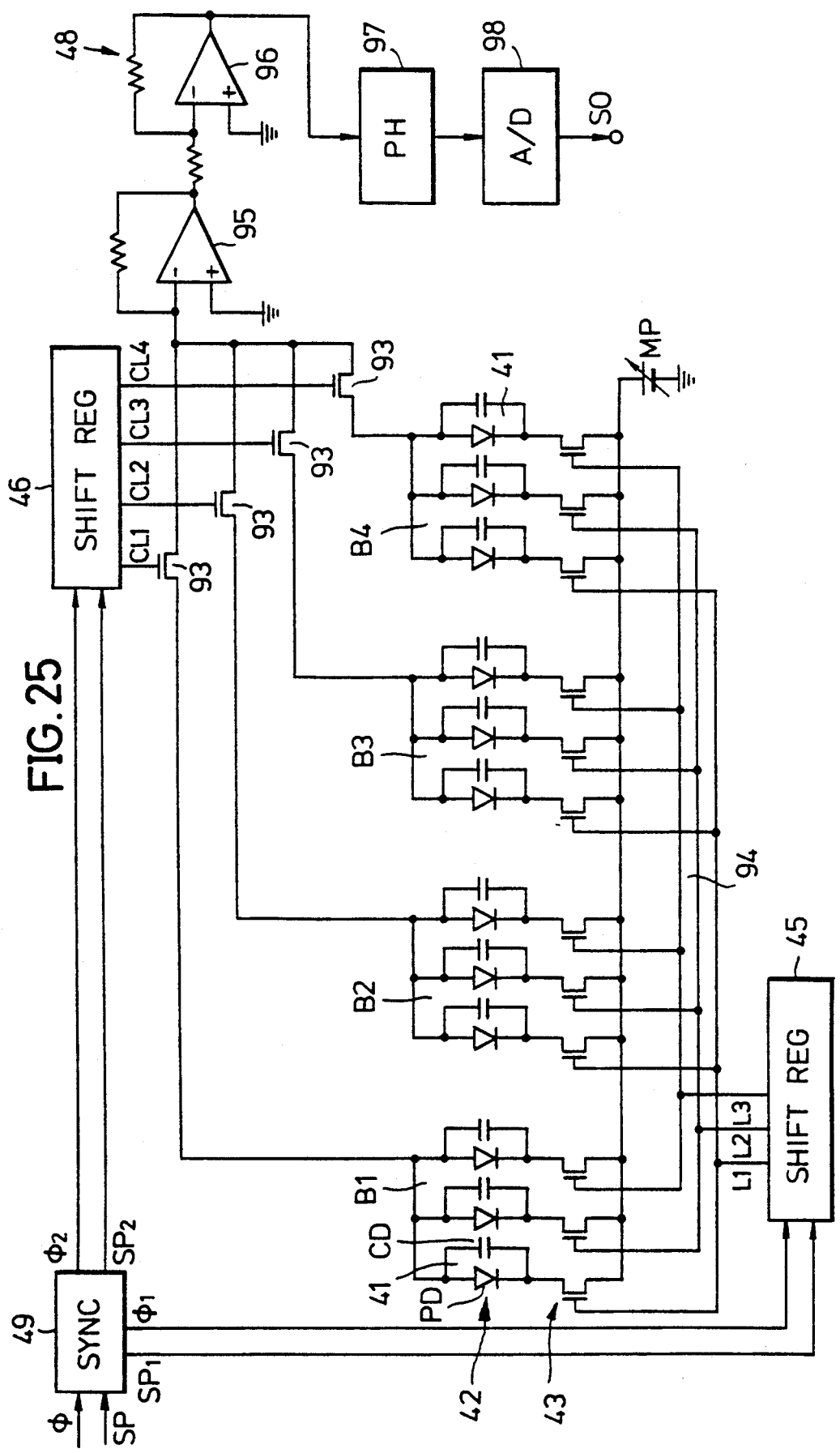
FIG. 25 is a system block diagram showing a sixth embodiment of the contact type image sensor according to the present invention.

Next, a description will be given of a sixth embodiment of the contact type image sensor according to the present invention. FIG. 25 shows the sixth embodiment of the contact type image sensor according to the present invention. In FIG. 25, those parts which are essentially the same as those corresponding parts in FIG. 7 are designated by the same reference numerals, and a description thereof will be omitted. This sixth embodiment employs the matrix driving system of the fifth embodiment described above. In the sixth embodiment, the photoelectric conversion elements 41 are grouped into four blocks B1 through B4 respectively having three photoelectric conversion elements 41. The cathodes of the photodiodes PD are connected to corresponding analog switches 93. Hence, the analog switches are grouped into two groups of analog switches, one group including the switches 93 for selecting the block of the photoelectric conversion elements 41 and the other group including the switches of the analog switch part 43 for selecting each of the photoelectric conversion elements 41 within the selected block.

The shift registers 45 and 46 are provided in correspondence with the two groups of analog switches. The shift register 45 is coupled to the analog switch part 43 through a matrix interconnection circuit 94 by three control lines L1, L2 and L3. For example, the control line L1 is connected to the gate of the leftmost switch of the analog switch part 43 in FIG. 25. On the other hand, the shift register 46 is connected to the gates of the analog switches 93.

The outputs of the analog switches 93 are connected in common to the signal processing circuit 48. The signal processing circuit 48 has operational amplifiers 95 and 96, a peak holding circuit 97 and an A/D converter 98.

The synchronizing circuit 49 is connected to the shift registers 45 and 46. The synchronizing circuit 49 is supplied with a reference clock signal $\phi$ and a start pulse signal SP, and supplies a clock signal $\phi_1$ and a start pulse signal SP1 to the shift register 45 and a clock signal $\phi_2$ and a start pulse signal SP2 to the shift register 46. The timings of the clock signal $\phi_1$ and the start pulse signal SP1 are determined appropriately for the shift register 45, and the timings of the clock signal $\phi_2$ and the start pulse signal SP2 are determined appropriately for the shift register 46.

Therefore, the bit or the photoelectric conversion element 41 to be selected is determined by the matrix combination of the two shift registers 45 and 46 using the matrix interconnection circuit 94. For example, when the control line L1 of the shift register 45 is ON, the first bit is selected in each of the blocks B1 through B4. However, the driving control lines CL1 through CL4 of the shift register 46 are not yet ON in this state, and the charge transfer does not take place in the photoelectric conversion elements 41. As a result, no current detection is made in the operational amplifiers 95 and 96.

Thereafter, the driving control lines CL1 through CL4 of the shift register 46 sequentially become ON with a predetermined timing, and the analog switches 93 corresponding to the driving control lines CL1 through CL4 are sequentially turned ON thereby selecting the corresponding blocks B1 through B4. Hence, the signal from the first bit of the blocks B1 through B4 is supplied to the signal processing circuit 48 and successively detected.

Then, when the control line L1 of the shift register 45 is turned OFF and the control line L2 is turned ON (with the control line L3 remaining OFF), the second bit of the blocks B1 through B4 is selected. By sequentially turning ON the driving control lines CL1 through CL4 of the shift register 46 similarly as described above, the output of the photodetector 42 is detected one bit by one bit in the operational amplifiers 95 and 96. The output of the photodetector 42 amounting to all of the bits is detected by repeating such operations.

Figure 26:
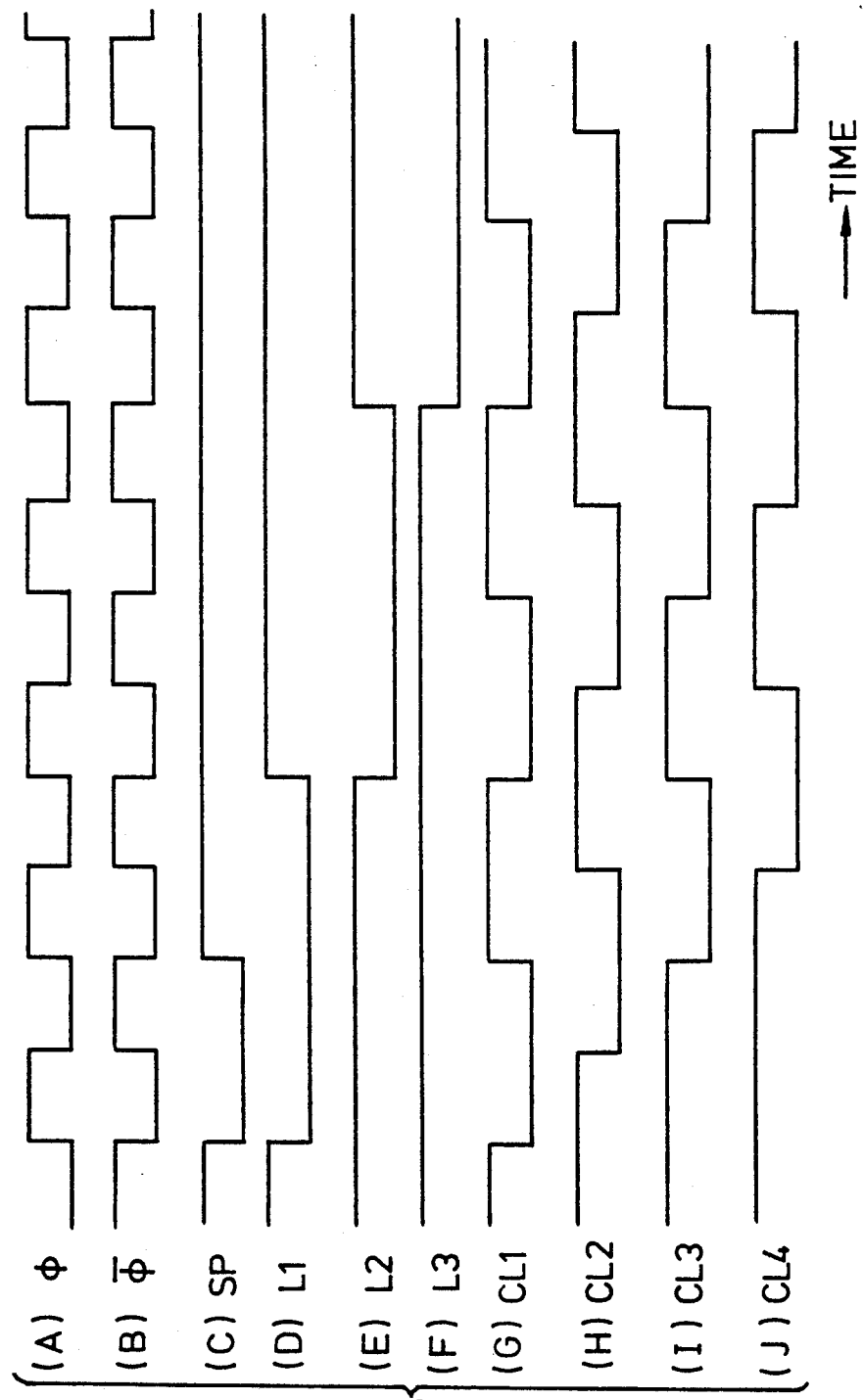
FIGS. 26(A) through 26(J) are timing charts for explaining the operation of the sixth embodiment.

The synchronization of the signals between the shift registers 45 and 46 and the frequency division of the data with respect to the reference clock signal $\phi$ are carried out in accordance with the timing charts shown in FIGS. 26(A) through 26(J). FIGS. 26(A) through 26(C) respectively show the reference clock signals $\phi$ and $\bar{\phi}$ and the start pulse signal SP. FIGS. 26(D) through 26(F) respectively show the outputs of the shift register 45 on the control lines L1 through L3. FIGS. 26(G) through 26(J) respectively show the outputs of the shift register 46 on the driving control lines CL1 through CL4.

Accordingly, when the shift register 45 has 64 bits and the shift register 46 has 27 bits, it is possible to drive 1728 ($=64\times27$) bits by the matrix combination of the shift registers 45 and 46. In this case, the total number of bits required by the shift registers 45 and 46 is 91 ($=64+27$) bits, and the driving circuit part including the shift registers 45 and 46 and the synchronizing circuit 49 only requires approximately 100 bits.

Figure 27:
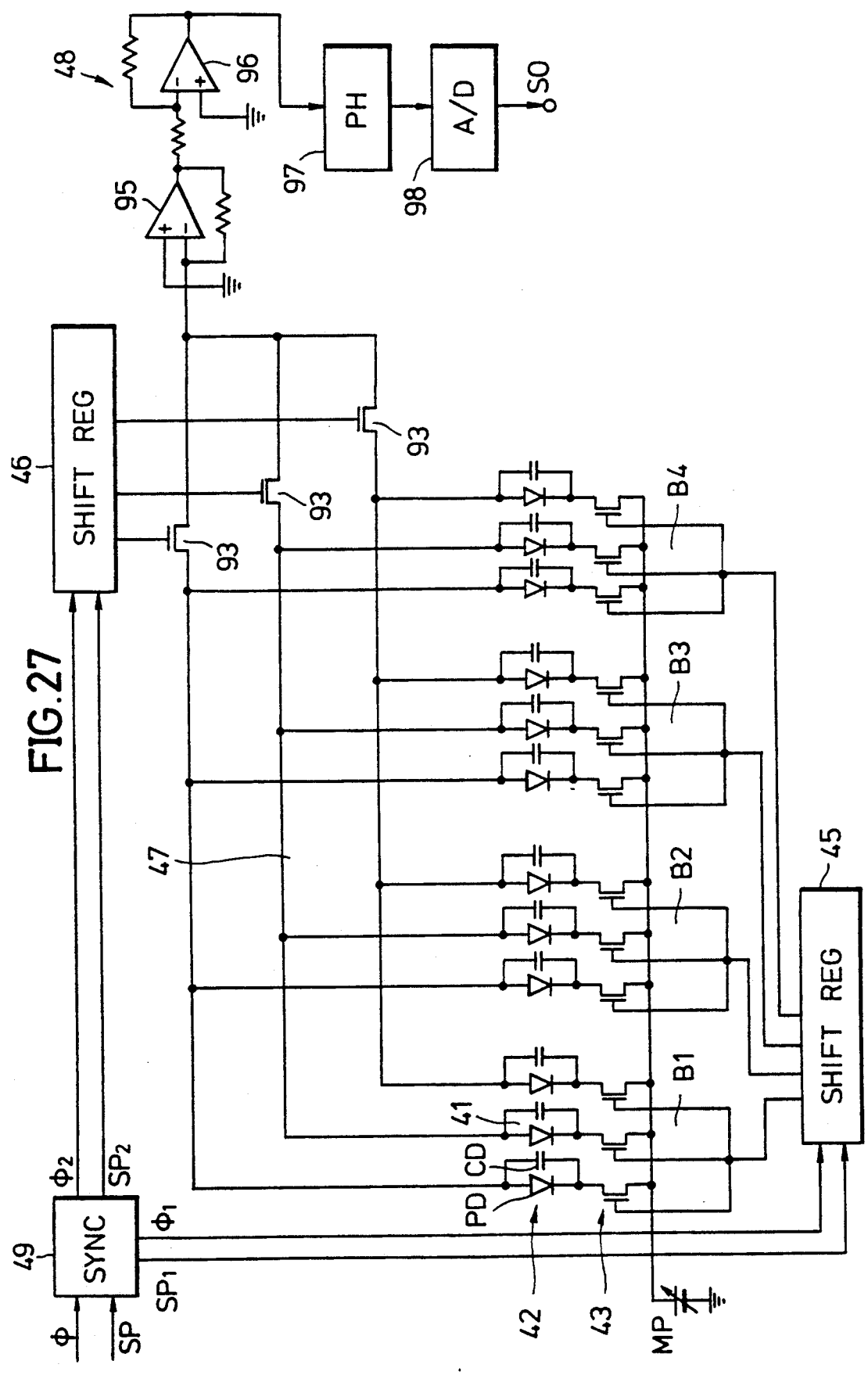
FIGS. 27, 28, 29 and 30 are system block diagrams respectively showing seventh, eighth, ninth and tenth embodiments of the contact type image sensor according to the present invention.

FIG. 27 shows a seventh embodiment of the contact type image sensor according to the present invention. In FIG. 27, those parts which are essentially the same as those corresponding parts in FIG. 25 are designated by the same reference numerals, and a description thereof will be omitted. In this seventh embodiment, the shift register 45 is used to select the block of photoelectric conversion elements 41, and the shift register 46 is used to select the photoelectric conversion element 41 within the selected block.

Figure 28:
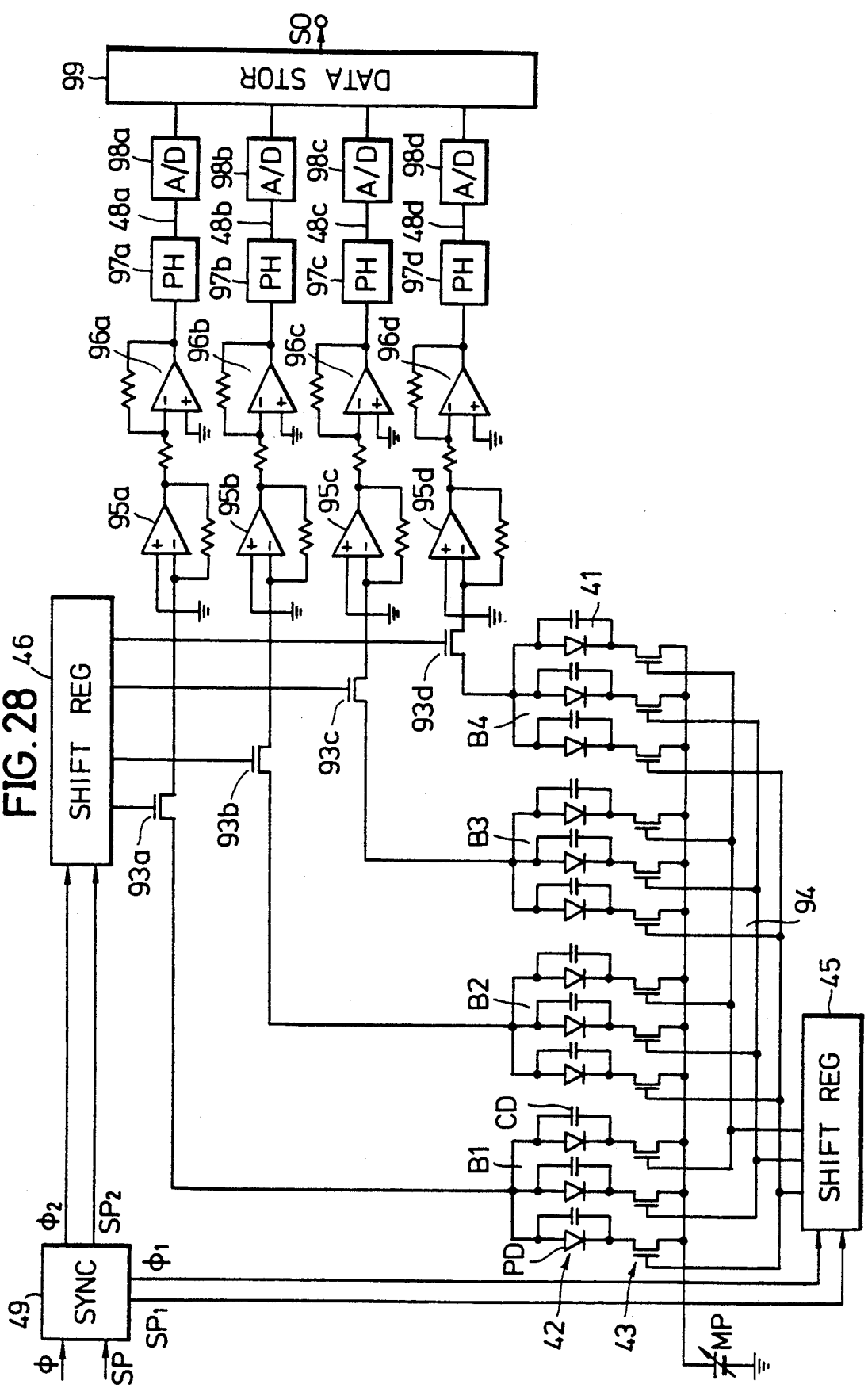

FIG. 28 shows an eighth embodiment of the contact type image sensor according to the present invention. In FIG. 28, those parts which are essentially the same as those corresponding parts in FIG. 25 are designated by the same reference numerals, and a description thereof will be omitted. In this eighth embodiment, signal processing circuits 48a through 48d are provided independently in correspondence with analog switches 93a through 93d. Hence, operational amplifiers 95a and 96a, a peak holding circuit 97a and an A/D converting circuit 98a are provided exclusively to constitute the signal processing circuit 48a, and the other signal processing circuits 48b through 48d are similarly constituted by elements having the corresponding reference character affixed to the reference numerals. Output signals of the A/D converting circuits 98a through 98d are supplied to a data storing circuit 99 which temporarily stores the output signals of the signal processing circuits 48a through 48d and outputs them simultaneously as the digital data SO.

According to the eighth embodiment, the detection of the read signals are independently carried out in the signal processing circuits 48a through 48d, and the output digital data SO of the image sensor is thus unaffected by a crosstalk which occurs by the matrix processing.

The operational amplifiers 95a through 95d and 96a through 96d and the like are formed in a form of an integrated circuit and externally connected to the image sensor. The externally connected integrated circuit is provided at a stage subsequent to the analog switches 93a through 93d which are controlled by the shift register 46.

Figure 29:
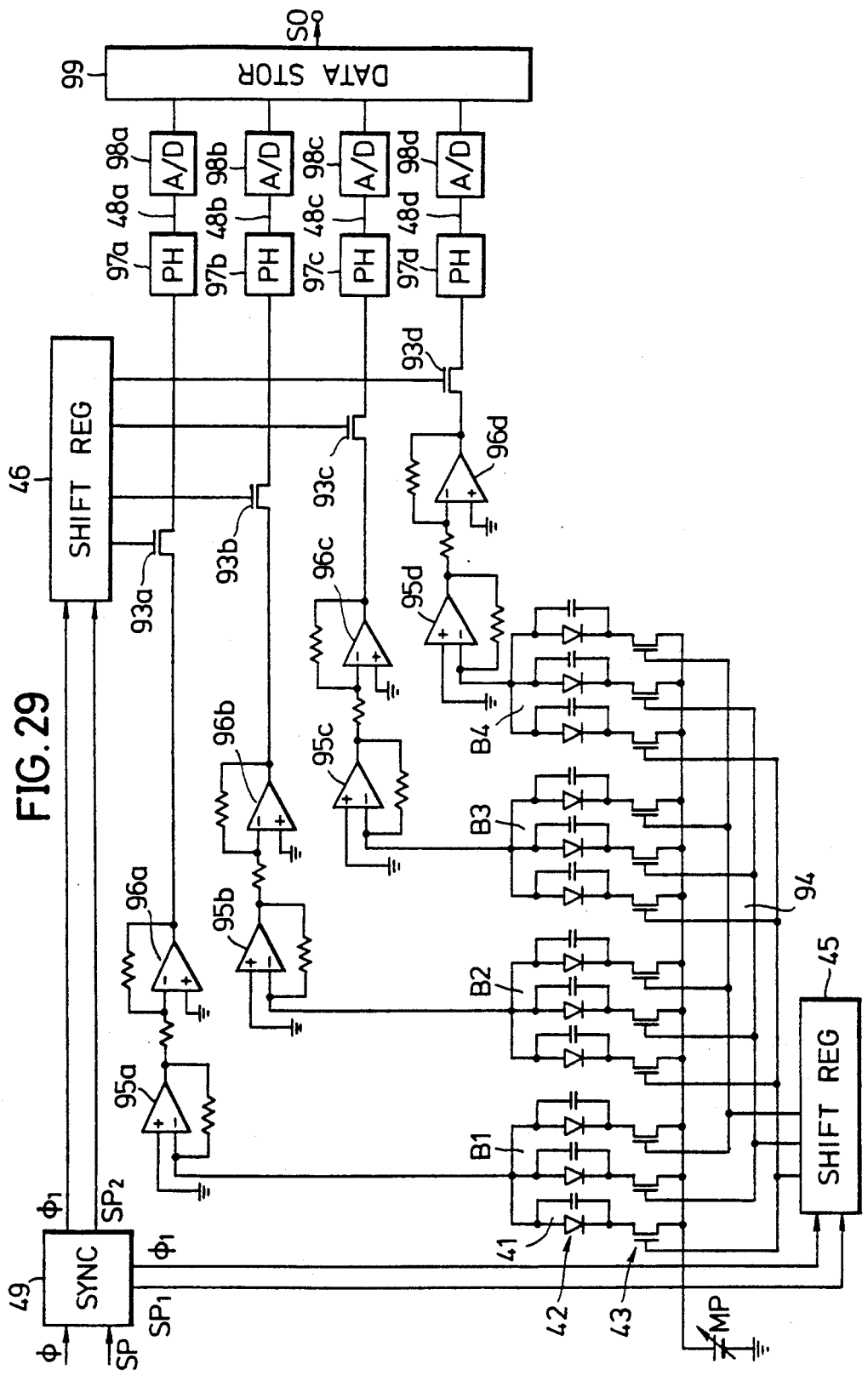

FIG. 29 shows a ninth embodiment of the contact type image sensor according to the present invention. In FIG. 29, those parts which are essentially the same as those corresponding parts in FIG. 28 are designated by the same reference numerals, and a description thereof will be omitted. In this ninth embodiment, the operational amplifiers 95a through 95d and 96a through 96d are formed in a form of an integrated circuit or thin film transistors and externally connected to the image sensor. The externally connected integrated circuit (or thin film transistors) is provided at a stage prior to the analog switches 93a through 93d which are controlled by the shift register 46.

Figure 30:
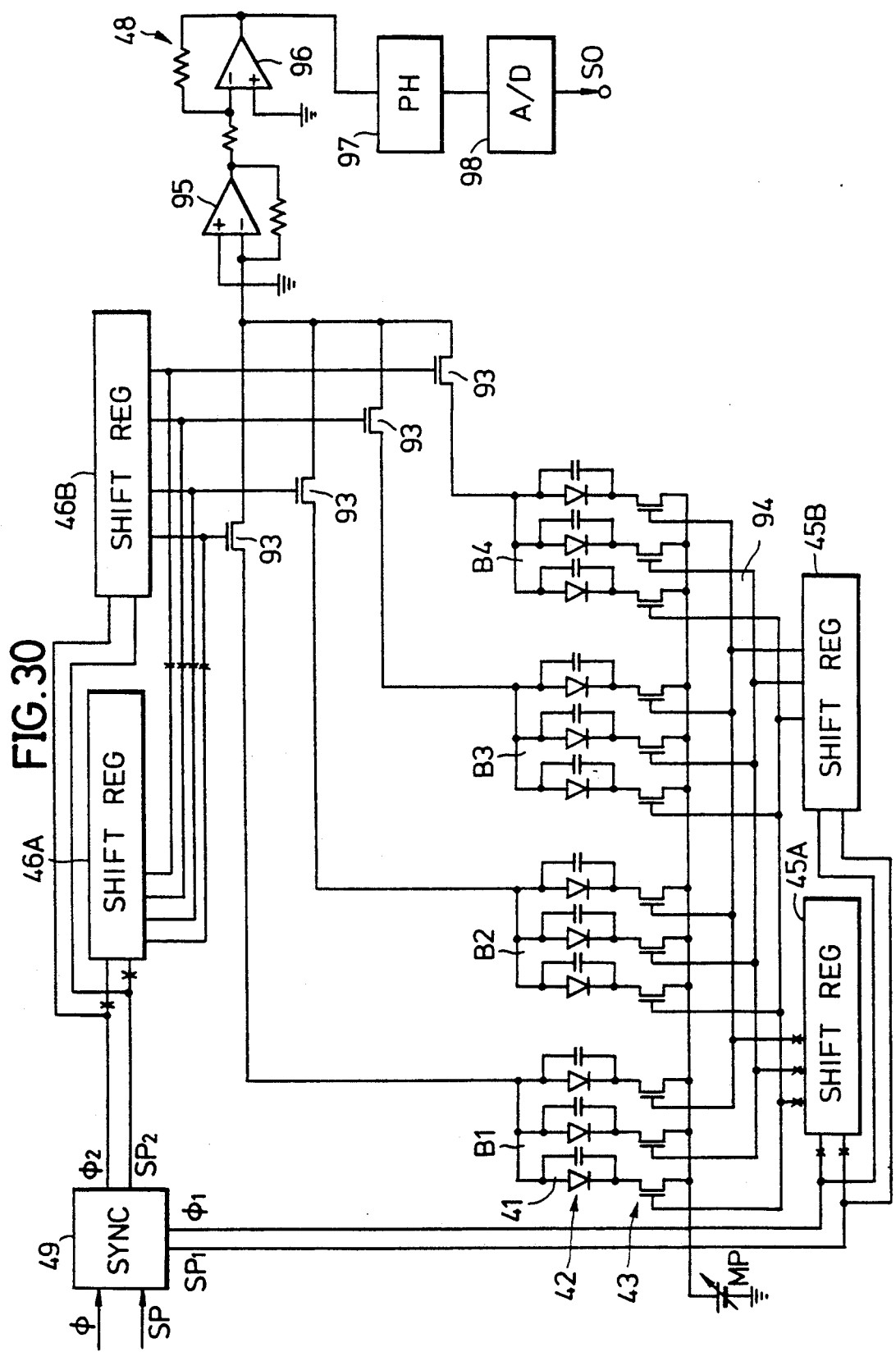

Next, a description will be given of a tenth embodiment of the contact type image sensor according to the present invention. FIG. 30 shows the tenth embodiment of the contact type image sensor. In FIG. 30, those parts which are essentially the same as those corresponding parts in FIG. 25 are designated by the same reference numerals, and a description thereof will be omitted. In the sixth embodiment shown in FIG. 25, the image sensor may carry out an erroneous operation or may not operated at all when at least one of the shift registers 45 and 46 fails. A failure of the shift register may be caused by a single bit thereof. Hence, in this tenth embodiment, the pair of shift registers 45A and 45B is provided in place of the shift register 45, and the pair of shift registers 46A and 46B is provided in place of the shift register 46. Hence, when one of the pair of registers 45A and 45B (or 46A and 46B) fails, it is possible to use the other. Because it is possible to greatly reduce the area occupied by the shift registers in the present invention, it is possible to provide such redundant or auxiliary shift registers and the total area occupied by the shift registers including the redundant shift registers is still considerably reduced compared to that of the conventional contact type image sensor.

For example, the shift registers 45A and 46A are initially used for the driving circuit of the image sensor. The shift registers 45A and 46A may be tested by inputting a test data therein and reading out the output signals to determine whether or not the actual output signals coincide with predetermined output signals which should be obtained responsive to the test data. When it is found by the test that the shift register 45A (46A) contains a defect, the shift register 45A (or 46A) is disconnected from the remaining part of the image sensor by cutting an interconnection, for example, and the shift register 45B (or 46B) is used in place of the defective shift register 45A (or 46A).

When the defective shift register (for example, the shift register 45A) remains connected to the remaining part of the image sensor, that is, the normal (non-defective) shift register (for example, the shift register 45B), the defective shift register may interfere with the operation of the non-defective shift register. Such an interference includes a signal delay caused by a parasitic capacitance and a mixing of an erroneous signal due to an erroneous operation. For this reason, it is desirable that the shift registers 45A, 45B, 46A and 46B are connected to the remaining part of the image sensor by wire bonding or metal thin film interconnection so that the defective shift register may easily be disconnected from the non-defective shift register by cutting or destroying the wire bonding or metal thin film interconnection. The cutting may be carried out by heating the interconnection using a light beam or an electron beam, for example. It is of course possible to provide a switching means for disconnecting the defective shift register from the non-defective shift register.

The portions of the interconnection where the interconnection may have to be cut when a defective shift register exists is made of a metal such as Al having a relatively low melting point. For example, the portions to be cut when the shift registers 45A and 46A fail are indicated by "X" in FIG. 30.

The timing charts become substantially the same as those shown in FIGS. 26(A) through 26(J) when the shift registers 45B and 46B are used for the driving circuit.

FIGS. 31A and 31B show embodiments of the structure of the tenth embodiment of the image sensor. In FIGS. 31A and 31B, those parts which are the same as those corresponding parts in FIG. 30 are designated by the same reference numerals, and a description thereof will be omitted.

Therefore, according to the tenth embodiment, the reliability of the image sensor is greatly improved because it is possible to use the redundant shift register even when a shift register fails for some reason.

Figure 32:
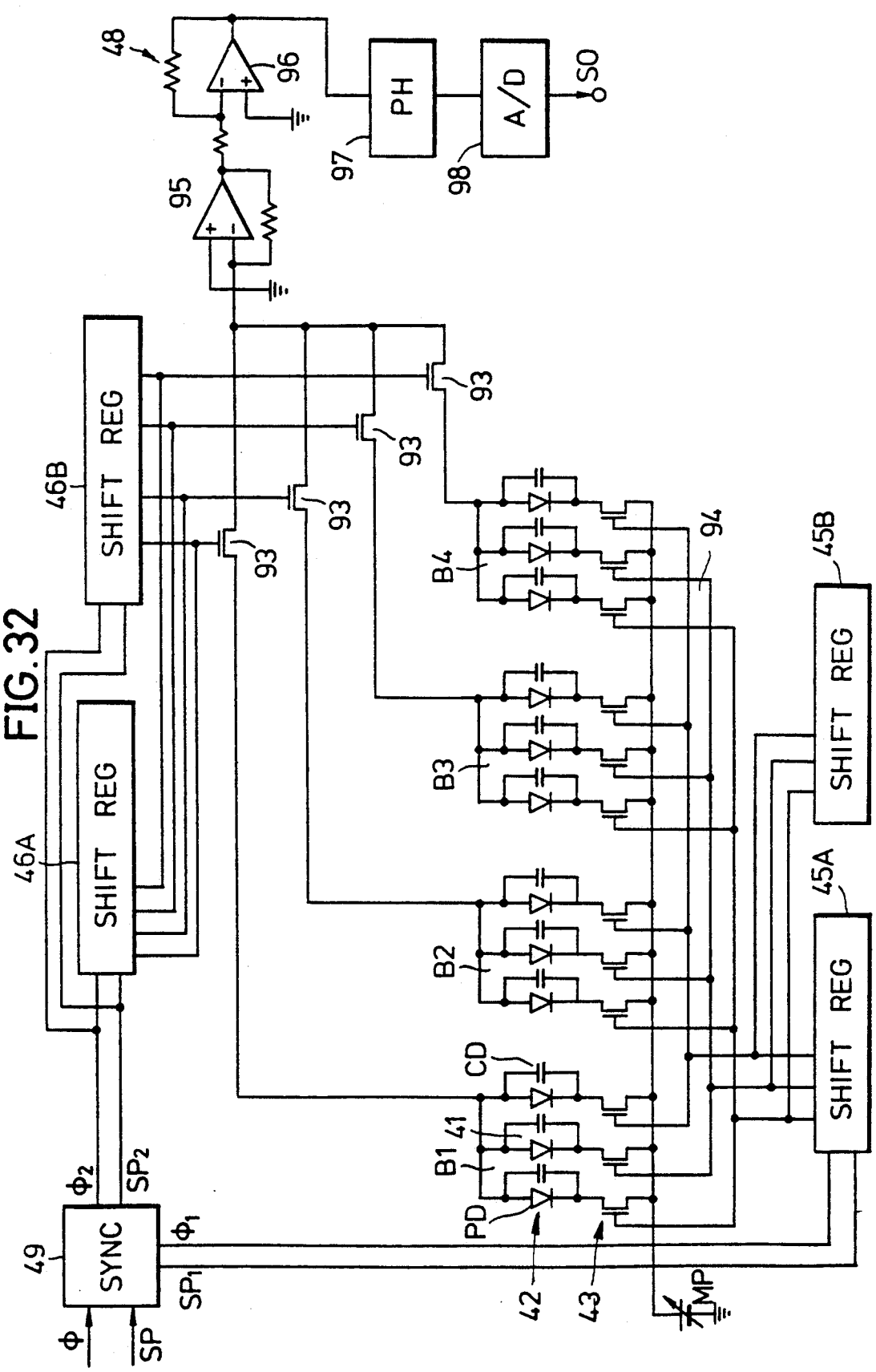
FIG. 32 is a system block diagram showing an eleventh embodiment of the contact type image sensor according to the present invention.

FIG. 32 shows an eleventh embodiment of the contact type image sensor according to the present invention. In FIG. 32, those parts which are essentially the same as those corresponding parts in FIG. 32 are designated by the same reference numerals, and a description thereof will be omitted. In the tenth embodiment, the interconnection from the shift registers 45A and 45B to the matrix interconnection circuit 47 are made independently, thereby resulting in a large number of intersections. This means that the tenth embodiment is easily affected by the line capacitance. But in the eleventh embodiment, a portion of the interconnection from the shift register 45A to the matrix interconnection circuit 47 is used in common with the shift register 45B, and the number of intersections is reduced compared to the tenth embodiment. Consequently, the eleventh embodiment requires a smaller number of portions where the interconnection needs to be cut when one of the shift registers fails.

Further, the present invention is not limited to these embodiments, but various variations and modifications may be made without departing from the scope of the present invention.

What is claimed is:

1. A contact type image sensor comprising:
a photodetector made up of a plurality of photoelectric conversion elements;
switching means including a plurality of switches respectively coupled to the photoelectric conversion elements of said photodetector;
driving means including first and second shift registers coupled to said switching means for sequentially driving the photoelectric conversion elements of said photodetector through said switching means and a synchronizing circuit for synchronizing operation timings of the first and second shift registers; and
a substrate on which each of said photodetector, said switching means and said driving means are integrally provided;
said first shift register sequentially selecting and passing outputs of said photoelectric conversion elements in blocks through said switching means, each of said blocks having an arbitrary number of the photoelectric conversion elements;
said second shift register sequentially driving the photoelectric conversion elements within one block selected by said first shift register through said switching means;
said switching means including a first group of switches coupled between said photodetector and said first shift register for selecting the photoelectric conversion elements in said blocks responsive to an output of said first shift register and a second group of switches coupled between said photodetector and said second shift register for sequentially driving the photoelectric conversion elements within the block selected by said first shift register through the first group of switches responsive to an output of said second shift register;
said first group of switches including a number of switches corresponding to a number of said blocks, said second group of switches including a number of switches corresponding to a number of said photoelectric conversion elements.

2. A contact type image sensor comprising:
a photodetector made up of a plurality of photoelectric conversion elements;
switching means including a plurality of switches respectively coupled to the photoelectric conversion elements of said photodetector;
driving means including first and second shift registers coupled to said switching means for sequentially driving the photoelectric conversion elements of said photodetector through said switching means and a synchronizing circuit for synchronizing operation timings of the first and second shift registers;
a substrate on which each of said photodetector, said switching means and said driving means are integrally provided; and
a signal processing circuit for subjecting the output signals of said photoelectric conversion elements within one block to a signal processing including an analog-to-digital conversion,
said first shift register sequentially selecting and passing outputs of said photoelectric conversion elements in blocks through said switching means, each of said blocks having an arbitrary number of the photoelectric conversion elements;
said second shift register sequentially driving the photoelectric conversion elements within one block selected by said first shift register through said switching means;

said switching means including a first group of switches coupled between said photodetector and said first shift register for selecting the photoelectric conversion elements in said blocks responsive to an output of said first shift register and a second group of switches coupled between said photodetector and said second shift register for sequentially driving the photoelectric conversion elements within the block selected by said first shift register through the first group of switches responsive to an output of said second shift register, said signal processing circuit being provided independently with respect to each of said blocks.

3. A contact type image sensor as claimed in claim 2 in which said signal processing circuit has a current-to-voltage converting circuit, said current-to-voltage converting circuit being provided on an output side of a corresponding one of the switches of said first group of switches.

4. A contact type image sensor as claimed in claim 2 in which said signal processing circuit has a current-to-voltage converting circuit, said current-to-voltage converting circuit being provided on an input side of a corresponding one of the switches of said first group of switches.

* * * * *

UNITED STATES PATENT AND TRADEMARK OFFICE
CERTIFICATE OF CORRECTION

PATENT NO. : 5,027,226
DATED : June 25, 1991
INVENTOR(S) : Takehito Nagata et al.

It is certified that error appears in the above-identified patent and that said Letters Patent is hereby corrected as shown below:

On the title page, item [73] Assignee: "Rocoh Research Institute of General Electronics" should read --Ricoh Research Institute of General Electronics--.

Signed and Sealed this

Seventeenth Day of November, 1992

Attest:

DOUGLAS B. COMER

*Attesting Officer*   Acting Commissioner of Patents and Trademarks